(12) United States Patent
Buckmann et al.

(10) Patent No.: US 7,217,758 B2
(45) Date of Patent: *May 15, 2007

(54) POLYMERIC AQUEOUS COATING COMPOSITIONS

(75) Inventors: Alfred Jean Paul Buckmann, Holland (NL); Emilio Martin, Holland (NL); Gerardus Cornelis Overbeek, Holland (NL); Johannes Ludovicus Martinus Van Hilst, Holland (NL); Jurgen Scheerder, Holland (NL); Pablo Steenwinkel, Holland (NL); Ronald Tennebroek, Holland (NL)

(73) Assignee: DSM IP Assets B.V., Heerien (NL)

( * ) Notice: Subject to any disclaimer, the term of this patent is extended or adjusted under 35 U.S.C. 154(b) by 75 days.

This patent is subject to a terminal disclaimer.

(21) Appl. No.: 10/381,261

(22) PCT Filed: Oct. 12, 2001

(86) PCT No.: PCT/GB01/04549

§ 371 (c)(1),
(2), (4) Date: Mar. 24, 2003

(87) PCT Pub. No.: WO02/33013

PCT Pub. Date: Apr. 25, 2002

(65) Prior Publication Data

US 2003/0191236 A1 Oct. 9, 2003

(30) Foreign Application Priority Data

Oct. 14, 2000 (GB) .................. 0025210.6

(51) Int. Cl.
C08J 3/03 (2006.01)
(52) U.S. Cl. .................. 524/501; 524/502; 524/522; 524/523; 524/515; 524/556; 524/543; 524/804; 524/832

(58) Field of Classification Search .............. 524/503, 524/507, 513, 543, 556, 804, 501, 502, 522, 524/523, 515, 832
See application file for complete search history.

(56) References Cited

U.S. PATENT DOCUMENTS

| | | | | |
|---|---|---|---|---|
| 4,190,693 A | | 2/1980 | Martorano et al. | 428/209 |
| 5,306,765 A | * | 4/1994 | Kuriyama et al. | 524/547 |
| 5,356,973 A | | 10/1994 | Taljan et al. | 524/314 |
| 5,962,554 A | * | 10/1999 | Pakusch et al. | 523/342 |
| 6,303,189 B1 | * | 10/2001 | Gray et al. | 427/385.5 |

FOREIGN PATENT DOCUMENTS

EP  0 210 747  2/1987

OTHER PUBLICATIONS

Patent Abstracts of Japan, 55035373, vol. 004, No. 070, May 23, 1980.

* cited by examiner

*Primary Examiner*—Peter D. Mulcahy
(74) *Attorney, Agent, or Firm*—Morgan Lewis & Bockius LLP

(57) ABSTRACT

An aqueous coating composition comprising a crosslinkable water-dispersible oligomer(s), a dispersed polymer(s) and optionally a non-crosslinkable water-dispersible oligomer wherein the crosslinkable oligomer(s) and non-crosslinkable oligomer(s) comply with Equation 1 as follows:

$$-15 \times 10^4 < L = \frac{Mw \times PDi^{0.8}}{A} \times (1+Q)^{0.5} + \{(Mw \times PDi^{0.8})/A\}^{0.5} \times V - Y - Z < 40 \times 10^4.$$

25 Claims, 1 Drawing Sheet

POLYMERIC AQUEOUS COATING COMPOSITIONS

The present invention relates to certain aqueous ambient temperature crosslinkable and shelf stable polymer compositions which, inter alia, provide coatings having an improved open time and wet edge time as well as a good tack-free time.

A general need when applying a decorative or protective coating to a substrate is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent based alkyds with an open time of 30 to 45 minutes are available in the decorative "Do-it-Yourself" DIY market. However the disadvantage of organic solvent based coatings is the toxic and flammable nature of such solvents and the pollution and odour caused on evaporation as well as the relatively high cost of organic solvents.

Thus with the continuing concern about the use of organic solvent based coatings there has been a long felt need for an aqueous coating composition with comparable properties to those achievable using organic solvent based compositions.

Unfortunately, aqueous polymer coating compositions currently known in the art do not offer a combination of drying properties which would make them fully comparable (or even superior) to solvent-based coatings, and in particular do not provide desirably long open and wet edge times (as discussed above and also later) together with desirably short tack-free times (discussed later).

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of its highly molecular weight, the lapping (i.e. wet edge) time of the composition is poor.

It is known from the prior art that a longer wet edge or open time is achievable by using solution-type aqueous oligomers (U.S. Pat. No. 4,552,908) which can be diluted with large amounts of organic solvent(s) in order to create a low viscosity continuous phase during drying of the film. However, these systems have high Volatile Organic Contents (VOC's) and are generally unacceptably water-sensitive.

Open time can also be prolonged by using evaporation suppressants (such as eicosanol), as described in for example EP 210747. However, water sensitivity is also a problem in this case. Moreover, the wet edge open time is insufficiently improved by using such evaporation suppressants.

From the literature it is also known that open time is easily prolonged by using low solids contents in the aqueous polymer compositions, but this generally results in the need to apply many layers of paint (for good opacity). In addition, the wet edge time is generally only moderately influenced by reducing the solids content of an aqueous coating composition with water.

Longer times for repairing irregularities can be achieved by employing aqueous coating compositions in which the binder polymers have very low viscosities. However, hitherto, a problem with such low viscosity polymer binders, is that the resultant coatings have a slow drying rate, resulting in the coating remaining tacky for an unacceptably long time. A coating should also dry sufficiently quickly to avoid the adherence of dust and to ensure that the coating quickly becomes waterproof (in case of outdoor applications), and as discussed above quickly becomes tack-free.

Indeed, the difficulty in developing aqueous polymer coating compositions having a desirable combination of drying properties when coated onto a substrate has been particularly discussed in a recent interview given by Professor Rob van der Linde (Professor of Coatings Technology, University of Technology, Eindhoven, NL) and Kees van der Kolk (Sigma Coatings) and reported in "Intermediair" 10.06.1999, 35(23), pages 27–29. In this interview, concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents, forming a major component of such compositions, are toxic and expensive. The interview also mentions that in the coming years, three universities will cooperate in a project to overcome the drying disadvantages of aqueous paints. Thus this interview emphasises the current need and desirability for achieving aqueous polymer coatings compositions having improved drying properties.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this application).

The wet edge time for a coating composition is the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. (A more formal definition of wet edge time is provided later in this specification).

We have now invented aqueous coating compositions having advantageous drying properties, and which (surprisingly in view of the comments by van der Linde and van der Kolk) avoid the drawbacks of the currently available compositions.

According to the present invention there is provided an aqueous coating composition comprising a crosslinkable water-dispersible oligomer(s), a dispersed polymer(s) and optionally a non-crosslinkable water-dispersible oligomer(s) wherein the crosslinkable oligomer(s) and non-crosslinkable oligomer(s) comply with Equation 1 as follows:

$$-15 \times 10^4 < L =$$
$$\frac{Mw \times PDi^{0.8}}{A} \times (1+Q)^{0.5} + \{(Mw \times PDi^{0.8})/A\}^{0.5} \times V - Y - Z < 40 \times 10^4$$

wherein:

L for the oligomer being calculated is a dimensionless number; all values are used as values without their dimensions, except for the values used in the sine functions which are defined below;

Mw=weight average molecular weight;

PDi=polydispersity index;

Q=(meq COOH/100 g)/15+(meq OH/100 g)/200+ [(meq{urethane*+urea*}/100 g)/75]+[(meq{urethane+urea}/100 g)/220]+(meq rings/100 g)/90+(meq amide/100 g)/85+(meq nitrile/100 g)/100, where meq COOH/100 g represents the milliequivalents of carboxylic acid groups present per 100 g of solid oligomer(s) that is being calculated and mutatis mutandis for OH groups, rings (i.e. aromatic, cycloaliphatic or heterocyclic rings) urethane, urea, amide and nitrile, it being understood that not all such groups need to be present, in which case the meq. would be zero and where *=not derived from tetramethyl-1,3-xylenediisocyanate and where **=derived from tetramethyl-1,3-xylenediisocyanate;

A={([9+3.16×$\Sigma_{i=1}^{n}${wt. % solvent i×0.1/[evaporation rate solvent i]$^{0.6}$}]/20)+0.025×(plasticiser wt. %+reactive diluent wt. %)}, where the wt. % of solvent, plasticiser and reactive diluent present in the total composition in each case are based on the weight of crosslinkable and non-crosslinkable oligomer(s) in the composition;

n=total number of solvents, and if no solvent is present A=0.45, and where for all solvents with an evaporation rate less then 0.03 the value for the evaporation rate is to be taken as 0.03, Y=30000×sine {(polyoxyethylene residue wt. %)×3.6} where {(polyoxyethylene residue wt. %)×3.6} is expressed in the unit degrees, and where the wt. % of polyethyleneoxide residue is based on the weight of the oligomer [that is being calculated];

Z=fatty acid group residue wt. %×2,000 where the wt. % of fatty acid group residue is based on the weight of the oligomer [that is being calculated];

V=(P+{P/(P+0.1)}×75,000)×{Mw/[100×(Mw+20,000)]}, and

P=({sine[((methyl residue wt. %+(0.2×(styrene residue wt. %+alphamethylstyrene residue wt. %)))×6)−45]+1}$^4$× 200,000×R), where [((methyl residue wt. %+(0.2×(styrene residue wt. %+alphamethylstyrene residue wt. %)))×6)−45] is expressed in the unit degrees and the wt. % of methyl, styrene and alphamethylstyrene residues are based on the weight of vinyl oligomer [that is being calculated] excluding fatty acid groups, and R=2.7 and if less then 4 wt % vinyl oligomer is present based on the weight of binder material then R=zero;

Preferably $-15 \times 10^4 < L \leq 25 \times 10^4$ and especially $-10 \times 10^4 \leq L \leq 10 \times 10^4$.

To obtain a sufficient open time and wet edge time, it is essential to keep the viscosity of the film low enough for a certain period of time after application of the composition on a substrate. In the invention, a crosslinkable oligomer(s) is used in conjunction with a dispersed polymer(s). Without wishing to be bound by the following explanation it is believed that after an initial drying stage, when one would normally observe an increase in viscosity, the systems will get to a stage where the crosslinkable and any non-crosslinkable oligomer(s) optionally together with some of the water and solvent will become the continuous phase. The value for L gives an indication of the viscosity of this continuous phase. The viscosity of the continuous phase affects the open time and wet edge time and the dispersed polymer affects the dust free and tack free times.

There are a number of factors which influence the viscosity of the continuous phase in the drying film including i) the molecular weight; ii) the molecular weight distribution of the oligomer(s); iii) the amount of solvent and its evaporation rate (factor A); iv) the interaction between the oligomer(s) in the film (factor Q); v) the fatty acid content (factor Z); v) the nonionic content (factor Y); and vi) the chain rigidity of vinyl oligomer(s) (factor V). The less the interaction between the oligomer(s), the lower the viscosity of the continuous phase. The fatty acid content and nonionic content will generally reduce viscosity of the continuous phase and these values are therefore subtracted in the equation. Chain rigidity may be quantified by the involvement of the amount of methyl and/or aromatic groups in the calculation, the more methyl and/or aromatic groups are present, the higher the viscosity of the continuous phase.

When calculating L for any binder material it is necessary to initially assume that the binder material (herein defined as crosslinkable oligomer(s) solids, non-crosslinkable oligomer(s) solids and dispersed polymer(s) solids present in the composition of the invention) is an oligomer. If L is $\geq 40 \times 10^4$ it means the binder material is a dispersed polymer and as a consequence of this the binder material will not be considered as an oligomer. If L is $<40 \times 10^4$ it means the binder material is an oligomer. The term oligomer(s) as used herein includes crosslinkable oligomer(s) and the optional non-crosslinkable oligomer(s) (if present) unless the specific term crosslinkable oligomer(s) or non-crosslinkable oligomer(s) is used.

In a preferred embodiment the value of L is $\leq 6 \times 10^4 +$ {(wt. % oligomer/(wt. % oligomer+wt. % dispersed polymer)}×300,000, more preferably L is $\leq 1.5 \times 10^4 +$ {(wt. % oligomer/(wt. % oligomer+wt. % dispersed polymer)}×80,000 and most preferably L is $\leq -2.5 \times 10^4 +$ {(wt. % oligomer/(wt. % oligomer+wt. % dispersed polymer)}×70,000.

For the use of Equation 1 if the oligomer(s) is a vinyl oligomer(s) the methyl residue % is defined as the percentage of $CH_3$ groups present in a vinyl oligomer(s) based on the weight of this vinyl oligomer(s), where any fatty acid residues are not taken into account for the determination of the weight of the vinyl oligomer(s). Furthermore the $CH_3$ should originate from a methacrylate monomer or from alphamethylstyrene and be directly bound to the main vinyl backbone. For example methacrylic acid contains such a methyl group after polymerisation, whereas methylacrylate does not. (By residue is meant a group attached to the oligomer(s) that is being calculated)

For the use of Equation 1, plasticisers are defined as non-crosslinkable, preferably liquid compounds with a molecular weight of 200 to 1000 g/mole, solvents are defined as liquid organic compounds with a molecular weight below 200 g/mole (and include organic co-solvents but exclude water, see later) and reactive diluents are defined as crosslinkable, preferably liquid compounds with a molecular weight of 200 to 1000 g/mole. Therefore any species with a molecular weight <1000 Daltons is classified as either as a solvent, reactive diluent or plasticiser and is therefore not taken into account for the determination of Mn, Mw or PDi. When the term Daltons is used in this application to give molecular weight data, it should be understood that this is not a true molecular weight, but a molecular weight measured against polystyrene standards. This means that when the material is put through a Gel Permeation Chromatography column (GPC), all species with a molecular weight below 1000 are ignored when calculating the Mw and PDi of the oligomer. As a result of this it also means that all species with a molecular weight below 1000 will not be counted as a oligomer(s) when calculating the amount of oligomer(s), for example when calculating the oligomer(s)/dispersed polymer(s) ratio.

For practical purposes calculating the L-value with the use of Equation 1, any species (excluding amines) with a molecular weight below 200 g/mole and an evaporation rate >0.2, which may be present as typical formulation additives, such as drier salts, leveling and wetting agents, thickeners, defoamers, catalysts and the like, can be ignored at any level below 1% by weight of oligomer(s) (for example isobutanol as present in Byk 344 (See Example 1 below) is present in an amount <1% by weight of oligomer(s). The evaporation rate of isobutanol is 0.64, therefore the amount of isobutanol can be ignored calculating the L-value in this example). Any plasticiser may be ignored at any level below 0.5% by weight of oligomer(s).

For practical purposes calculating the L-value with the use of Equation 1 any rings possibly originating from any dimerised fatty acid may be ignored as the contribution of these rings in the composition are of a minor influence.

For practical purposes any material(s) with a Mw below 8000 Daltons and containing more then 50 wt % of ethylene oxide groups will be considered as non-polymeric and hence no calculation of the L-value will be required to determine whether this is an oligomer(s) or a dispersed polymer(s).

For the calculation of the L-values of the binder materials in the composition, the following procedure should be followed:

Initially all species with Mw >1000 g/mole are regarded as oligomer(s). First the L-value is calculated starting with the component with the highest Mw.

The value for A is first calculated regarding all binder solids with Mw >1000 g/mole as oligomer. Based on this the L-value of this material is calculated.

If the L-value of the highest Mw material is greater than $40 \times 10^4$ then this material is considered as a dispersed polymer(s). Two things are assumed for calculating the L-value, (i) all solvents, plasticisers and reactive diluents will partition into the oligomer(s), and (ii) there is no mixing of the oligomer(s) and the dispersed polymer(s) (off course it is to be understood that in reality there would be some mixing on drying). Therefore, since the existence of the dispersed polymer(s) has been defined (by having an L-value greater than $40 \times 10^4$) it is assumed for the purpose of calculating the L-value of a dispersed polymer(s) that there is no solvent, plasticiser or reactive diluent partitioned into the dispersed polymer(s), and as a consequence A is taken to be 0.45 for the recalculation of the L value of the dispersed polymer(s).

This also means that the value for A needs to be recalculated before it can be used for the calculation of the other binder materials in the composition. This is because the weight percentage of solvent in calculating A is based on the oligomer solids.

Then the component with the next highest Mw is calculated.

If this results in an L-value smaller than $40 \times 10^4$, then this is an oligomer. Therefore there is no need to recalculate the value for A when calculating the L-value for the binder material which is next in the Mw order. If however the second calculation results in an L-value greater then $40 \times 10^4$ then this material also needs to be considered as "dispersed polymer" material and the procedure as described above should then be repeated with the next binder material in the Mw order.

Anytime that a binder material proves to be a dispersed polymer (due to having an L-value greater than $40 \times 10^4$) rather then oligomer, the A-value needs to be adapted and all oligomer(s) with a higher Mw that were already calculated need to be recalculated It is understood that in some cases it might prove difficult to obtain sufficiently accurate data to get an absolute L-value. For instance in some occasions there might be uncertainty about the exact amount and nature of co-solvent(s) in certain formulation additives or about the exact structure of certain additives that are used in the composition. It is therefore understood that errors up to a few thousand may occur. An error up to $\pm 3 \times 10^4$ in the L-value is defined as allowable and will only have a marginal effect on the final properties of the composition as long as L stays within the defined range of $-15 \times 10^4 < L < 40 \times 10^4$. Above $40 \times 10^4$ an error of (L/53,000) % is allowable with the proviso that the maximum allowable error can never exceed 30%. So for example for $L = 106 \times 10^4$ an error of 20% (which is $21.2 \times 10^4$) is still allowable. In the case where the allowed uncertainty in the L-values brings the L-value outside the claimed range for the oligomer(s) of $-15 \times 10^4 < L < 40 \times 10^4$ the binder material will be regarded as polymeric and will be referred to as a dispersed polymer.

Values for evaporation rates were published by Texaco Chemical Company in a bulletin Solvent Data: Solvent Properties (1990). (The values given are relative to the evaporation rate of n-butylacetate for which the evaporation rate (ER) is defined as 1.00). Determination of evaporation rates of solvents that are not listed in this bulletin is as described in ASTM D3539. Preferably the evaporation rate of the solvent is $\leq 0.3$, more preferably $\leq 0.08$, and especially $\leq 0.035$.

Preferably the amount of plasticiser % by weight based on the solids content of the composition is $\leq 20$ wt. %, still more preferably $\leq 10$ wt. %, especially $\leq 6$ wt. %, more especially $\leq 3$ wt. % and most especially 0 wt. % of plasticiser.

Preferably the amount of reactive diluent % by weight based on the solids content of the composition is $\leq 40$ wt. %, more preferably $\leq 20$ wt. %, especially $\leq 10$ wt. %, more especially $\leq 6$ wt. % and most especially $\leq 3$ wt. % of reactive diluent is used.

Preferably the viscosity of the oligomer(s) measured at 71 wt. % solids should in at least one solvent/water mixture (optionally with neutralising agent) with the same ratio that would be present for at least one point during the drying between 70 and 95 wt. % solids of the composition be $\leq 50$ Pa·s, more preferably $\leq 12$ Pa·s, still more preferably $\leq 5$ Pa·s, and especially $\leq 1.9$ Pa·s when measured at $23 \pm 2°$ C. and with a shear rate of $1000 \pm 100$ s$^{-1}$, especially $100 \pm 10$ s$^{-1}$ and most especially $10 \pm 1$ s$^{-1}$.

An alternative method for illustrating the drying profile of a film is by measuring the drying profile using a Thin Film Analyser (TFA), supplied by Rhopoint (Bexhill, UK). The TFA is computer controlled and consists of a probe attached to an arm which is moved and controlled by a computer. A scratch is obtained by pushing the probe through a drying film. The computer controls the probe and registers the force that the probe is experiencing in the drying film. The force that the probe is experiencing in the film is related to the viscosity of the film and the open time of the coating composition. During the drying process the force that the probe is experiencing in the film increases.

In a second embodiment of the present invention there is provided an aqueous coating composition comprising a crosslinkable water-dispersible oligomer(s), a dispersed polymer(s) and optionally a non-crosslinkable water-dispersible oligomer wherein said composition has a drying profile as determined using a Thin Film Analyser where the Thin Film Analyser shows an average force, for each series of successive scratches ($\geq 5$ scratches), measured during a five minute interval, of less than 12000 mg for at least the first 20 minutes, preferably 23 minutes, most preferably 26 minutes and an average force for at least one series of successive scratches ($\geq 5$ scratches), measured during a five minute interval of at least 12000 mg between 20 and 120 minutes, preferably between 50 and 120 minutes and more preferably between 20 and 60 minutes after application of the composition.

In said second embodiment the crosslinkable oligomer(s) and non-crosslinkable oligomer(s) preferably comply with Equation 1.

Preferably the average force for each series of successive scratches ($\geq 5$ scratches) measured during a five minute interval is less than 11000 mg, more preferably less than 10000 mg for at least the first 20 minutes, preferably 23 minutes and more preferably 26 minutes after application of the composition.

Preferably the average force for at least one series of successive scratches ($\geq 5$ scratches) measured during a five minute interval is at least 14000 mg between 50 and 120 minutes, preferably between 26 and 60 minutes, and more preferably between 30 and 55 minutes, after application of the composition.

Alternatively, the average force for at least one series of successive scratches ($\geq 8$ scratches) measured during an eight minute interval measured between 21 and 60 minutes after application is not more then 2000 mg higher then each series of successive scratches ($\geq 8$ scratches) measured during an eight minute interval in the first 20 minutes after application of the coating.

In a third and preferred embodiment of the present invention there is provided an aqueous coating composition comprising a crosslinkable water-dispersible oligomer(s), a dispersed polymer(s) and optionally a non-crosslinkable water-dispersible oligomer(s) wherein said composition has a drying profile as determined using a Thin Film Analyser, wherein:

(a) the average force for each series of successive scratches ($\geq 8$ scratches) measured during an eight minute interval in the first 20 minutes, more preferably 23 minutes, most preferably 26 minutes after application of the coating is less than 1.5, more preferably less than 1.35 and most preferably less than 1.25 times the average force for a series of successive scratches ($\geq 8$ scratches) measured during an eight minute interval between 7 and 15 minutes after application of the coating; and (b) the average force for at least one series of successive scratches ($\geq 8$ scratches) measured during an eight minute interval measured between 21 and 60 minutes after application is at least 2000 mg more, more preferably at least 2500 mg more, and most preferably at least 3000 mg more than each series of successive scratches ($\geq 8$ scratches) measured during an eight minute interval in the first 20 minutes, more preferably 23 minutes, most preferably 26 minutes after application of the coating In a fourth embodiment of the present invention the aqueous coating composition of the present invention has:

i) an open time of at least 20 minutes;
ii) a wet-edge time of at least 10 minutes;
iii) a tack-free time of $\leq 20$ hours;
iv) 0 to 25 wt. % of co-solvent by weight of the composition.

Open time is more formally defined as the maximum length of time, using the test method, under the specified conditions described herein, in which a brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method, under the specified conditions described herein, in which a brush carrying the aqueous composition of the invention can be applied to the edge region of a coating of the aqueous composition of the invention after which the coating flows back without leaving any lap lines so as to result in a homogenous film layer.

Preferably the wet-edge time is at least 12 minutes, more preferably at least 15 minutes, most preferably at least 20 minutes, especially at least 25 minutes and most especially at least 30 minutes.

The drying process can be divided in four stages namely the period of time necessary to achieve dust-free, tack-free, sandable and thumb-hard coatings using the tests described herein.

Preferably the dust free time is $\leq 4$ hours, more preferably $\leq 2$ hours and most preferably $\leq 50$ minutes.

Preferably the tack-free time is $\leq 15$ hours, more preferably $\leq 12$ hours and most preferably $\leq 8$ hours.

Preferably the thumb hard time is $\leq 48$ hours, more preferably $\leq 24$ hours, most preferably $\leq 16$ hours and especially $\leq 10$ hours.

Preferably the resultant coating is sandable within 72 hours, more preferably within 48 hours, still more preferably within 24 hours and especially within 16 hours.

In a fifth embodiment of the aqueous coating composition of the present invention the wet edge time in minutes of the aqueous coating is at least H/(wt. % solids of the aqueous coating composition)$^{0.5}$ wherein the solids content of the aqueous coating composition is between 15 and 70 wt. %, more preferably between 30 and 65 wt. % and most preferably between 40 and 60 wt. %, and H is a constant of 84, more preferably of 100, most preferably of 126 and especially of 151.

Preferably the viscosity of the composition of the invention, (including the oligomer(s) as well as the dispersed polymer(s)), measured during the drying of the paint film at ambient temperature at 71 wt. % solids if the composition contains a pigment or at 66 wt. % when the composition does not contain a pigment, should not exceed the viscosity of the oligomer(s) by more than 160 times, more preferably not by more than 40 times, still more preferably not by more than 15 times, especially not by more than 10 times more especially not by more than 4 times and most especially not by more than 2 times, when measured at 71% solids in the same solvent/water mixture as the composition, at ambient temperature and at a shear rate of $10\pm1s^{-1}$ and most especially $1\pm0.1s^{-1}$.

The solids content of the aqueous coating composition of the invention is preferably $\geq15$ wt %, more preferably $\geq25$ wt %, still more preferably $\geq35$ wt %, especially $\geq40$ wt % more especially $\geq45$ wt % and most especially $\geq50$ wt %. The upper limit of solids content is usually not more than 90 wt %, more preferably not more than 80 wt %.

The crosslinkable oligomer(s) may crosslink at ambient temperature by a number of mechanisms including but not limited to autoxidation, Schiff base crosslinking and silane condensation. By crosslinking by autoxidation is meant that crosslinking results from a oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s) such as an aldehyde, ketone or acetoacetyl group with a carbonyl-reactive amine and/or hydrazine (or blocked amine and/or blocked hydrazine) functional group. Examples of carbonyl-reactive amine (or blocked amine) functional groups include ones provided by the following compounds or groups: R—NH$_2$, R—O—NH$_2$, R—O—N=C<, R—NH—C (=O)—O—N=C< and R—NH—C(=O)—O—NH$_2$ where R is optionally substituted $C_1$ to $C_{15}$, preferably $C_1$ to $C_{10}$ alkylene, optionally substituted alicyclic or optionally substituted aryl, or R may also be part of a polymer. Examples of carbonyl-reactive hydrazine (or blocked hydrazine) compounds or groups include R—NH—NH$_2$, R—C(=O)—NH—NH$_2$, R—C(=O)—NH—N =C<, R—NH—C(=O)—NH—NH$_2$ and R—NH—C(=O)—NH—N=C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Preferably the crosslinkable oligomer(s) is a self-crosslinkable oligomer(s) (i.e crosslinkable without the requirement for added compounds for achieving crosslinking—although these can still be employed if desired). Preferably the crosslinking is by autoxidation, optionally in combination with other crosslinking mechanisms as discussed herein. Suitably autoxidation is provided for example by fatty acid groups containing unsaturated bonds or by allyl functional residues, β-keto ester groups. Preferably autoxidation is provided at least by fatty acid groups containing unsaturated bonds.

Preferably the concentration of unsaturated fatty acid groups in the crosslinkable oligomer(s) is 10 to 80%, more preferably 12 to 70%, most preferably 15 to 60% by weight based on the weight of the oligomer(s). Preferably the crosslinkable oligomer(s) contains at least 15%, more preferably at least 20% by weight of unsaturated fatty acid groups based on the weight of the oligomer(s). If combined with other autoxidisable groups in the aqueous coating composition, the fatty acid content may be below 10% by weight of the oligomer(s). For the purpose of determining the fatty acid group content of the crosslinkable oligomer(s) (Z in Equation 1), it is convenient for practical purposes to use the weight of the fatty acid reactant including the carbonyl group, but excluding the hydroxyl group of the terminal acid group of the fatty acid molecule. Suitable unsaturated fatty acids for providing fatty acid groups in the crosslinkable oligomer(s) include fatty acids derived from vegetable oil and non-vegetable oil such as soyabean oil, palm oil, linseed oil, tung oil, rapeseed oil, sunflower oil, tallow oil, (dehydrated) castor oil, safflower oil and fatty acids such as linoleic acid, palmitoleic acid, oleic acid, eleostearic acid, licanic acid, linoleic acid, arachidonic acid, ricinoleic acid, erucic acid, gadoleic acid, clupanadonic acid and/or combinations thereof. Particularly preferred are oligomer(s) in which the autoxidisable groups are only derived from unsaturated fatty acids. Preferably at least 40% by weight, more preferably at least 60% by weight, of the unsaturated fatty acid groups contain at least two unsaturated groups.

Other crosslinking mechanisms known in the art include the reaction of epoxy groups with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoamide) groups to form enamines. The use of blocked crosslinking groups may be beneficial.

The oligomer(s) may be completely water-soluble (which is less preferred) or only have partial solubility in water. If the oligomer(s) is only partially soluble the oligomer(s) preferably has low water solubility in a pH range of from 2 to 10 and is either self-water-dispersible (i.e. dispersible by virtue of a sufficient concentration of selected bound (in-chain, chain-pendant and/or chain-terminal) hydrophilic groups built into the oligomer(s), and thus not requiring high shear techniques and/or added surfactants to produce the dispersion, although such methods can also be included if desired), or is only dispersible in water with the aid of added (i.e. external) surface active agents and/or use of high shear mixing. Low water solubility confers the advantage of a reduced water-sensitivity of the applied coating to water. Such low water solubility is defined herein as the oligomer(s) being less than 80% by weight soluble in water throughout the pH range of from 2 to 10 as determined by a centrifuge test. Preferably the oligomer(s) is less than 70%, more preferably less than 50% most preferably less than 30% and especially $\geq10$ and $\leq30$% by weight soluble in water throughout the pH range of from 2 to 10.

The oligomer(s) preferably contains a sufficient concentration of bound hydrophilic water-dispersing groups capable of rendering the oligomer water-dispersible, but the concentration of such groups should not be so great that the oligomer has an unacceptably high water solubility in order to not compromise the water sensitivity of the final coating.

The type of hydrophilic groups capable of rendering the oligomer(s) water-dispersible are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by a propylene oxide segment and/or butylene oxide segment, however the polyethylene oxide group should still contain ethylene oxide as a major component. When the water-dispersible group is polyethylene oxide, the preferred ethylene oxide chain length is >4 ethylene oxide units, preferably >8 ethylene oxide units and most preferably >15 ethylene oxide units. Preferably the oligomer(s) have a polyethylene oxide content of 0 to 50% by weight, more preferably 3 to 45% by weight, most preferably 4 to 35% by weight and especially 5 to 25% by weight. Preferably the polyethylene oxide group has a Mw from 175 to 5000 Daltons, more preferably from 350 to 2200 Daltons, most preferably from 660 to 2200 Daltons.

Preferred ionic water-dispersing groups are anionic water-dispersing groups, especially carboxylic, phosphonic and or sulphonic acid groups. The anionic water-dispersing groups are preferably fully or partially in the form of a salt. Conversion to the salt form is optionally effected by neutralisation of the oligomer(s) with a base, preferably during the preparation of the oligomer(s) and/or during the preparation of the composition of the present invention. The anionic dispersing groups may in some cases be provided by the use of a monomer having an already neutralised acid group in the oligomer(s) synthesis so that subsequent neutralisation is unnecessary. If anionic water-dispersing groups are used in combination with a non-ionic water-dispersing group, neutralisation may not be required.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

Preferably the Mw of the oligomer(s) is in the range of from 1000 to 100,000, more preferably in the range of from 1200 to 80,000, most preferably in the range of from 1,200 to 65,000, especially in the range of from 1500 to 50,000 and most especially in the range of from 2200 to 40,000 Daltons, when measured by GPC with polystyrene standards.

Preferably a significant part of any crosslinking reaction only takes place after application of the aqueous coating composition to a substrate, to avoid an excessive molecular weight build up which may lead to an increased viscosity of the aqueous coating composition on the substrate in the early stages of drying.

The molecular weight limits of the oligomer(s) depend in part on the amount and type of co-solvent present in the aqueous composition of the invention, where a higher molecular weight limit is possible when there is more co-solvent in the composition, and the lower molecular weight preferences are more applicable to low or zero co-solvent concentrations.

The molecular weight distribution (MWD) of the oligomer(s) has an influence on the viscosity of the crosslinkable oligomer(s) in the bulk and in solution (situations which arise as the coating is drying on the substrate for example when a co-solvent is present), and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable oligomer(s). Preferably the value of PDi is less than 15, more preferably less than 10, and most preferably less than 5. In a preferred embodiment the value of $Mw \times PDi^{0.8}$ of the oligomer(s) is $\leq 400,000$, more preferably the $Mw \times PDi^{0.8}$ is $\leq 300,000$ and most preferably the $Mw \times PDi^{0.8}$ is $\leq 220,000$.

Preferably if Q <3 and PDi >20, any binder material with a molecular weight above 200,000 is defined as being a dispersed polymer(s) when calculating the amount of oligomer(s) in the composition (e.g. for the determination of the oligomer(s)/dispersed polymer(s) ratio) and this high molecular weight fraction is not taken into account when calculating the Mw and PDi (for the oligomer(s)) to be used in Equation 1.

More preferably if $3 \leq Q \leq 5$ and PDi >26, any binder material with a molecular weight above 200,000 is defined as being a dispersed polymer(s) when calculating the amount of oligomer(s) in the composition (e.g. for the determination of the oligomer(s)/dispersed polymer(s) ratio) and this high molecular weight fraction is not taken into account when calculating the Mw and PDi (for the oligomer(s)) to be used in Equation 1.

Most preferably if Q >5 and PDi >37, any binder material with a molecular weight above 200,000 is defined as being a dispersed polymer(s) when calculating the amount of oligomer(s) in the composition (e.g. for the determination of the oligomer(s)/dispersed polymer(s) ratio) and this high molecular weight fraction is not taken into account when calculating the Mw and PDi (for the oligomer(s)) to be used in Equation 1.

The crosslinkable oligomer(s) may comprise a single crosslinkable oligomer(s) or a mixture of crosslinkable oligomer(s). The crosslinkable oligomer(s) may optionally be used in conjunction with up to 250% by weight thereof of any type of non-crosslinkable oligomer(s) provided it has an L value $<40 \times 10^4$ as defined above in Equation 1 (for the crosslinkable oligomer(s)). In such cases, more preferably up to 120 wt. % of the non-crosslinkable oligomer(s) (based on the weight of crosslinkable oligomer(s)) is used, more preferably up to 70 wt. %, most preferably up to 30 wt. % especially up to 10 wt. %, and most especially 0 wt. %. Oligomer(s) include but are not limited to for example vinyl oligomer(s), polyamide oligomer(s), polycarbonate oligomer(s), polyester oligomer(s), polyether oligomer(s), polysiloxane oligomer(s) and/or polyurethane oligomer(s) and the oligomer(s) may optionally be branched. The preparation of such oligomers is well known in the art.

The crosslinker groups may be introduced into the oligomer(s) using two general methods: i) by utilising in the polymerisation process to form an oligomer(s), monomers carrying a crosslinker group; or ii) utilising monomers bearing selected reactive groups and which monomer is subsequently reacted with a compound carrying a crosslinker group and also a reactive group of the type which will react with the selected reactive groups on the monomer to provide attachment of the crosslinker group to the oligomer(s) via covalent bonding.

To prepare autoxidisably crosslinkable oligomer(s) preferably a monomer bearing unsaturated fatty acid group(s) as crosslinker groups may be used in the oligomer(s) synthesis.

Hydrophilic water-dispersing groups (or groups which may be subsequently converted to such water-dispersing groups) are optionally introduced into the oligomer(s) using two general methods: i) by utilising in the polymerisation process to form an oligomer(s) monomers carrying a hydrophilic water-dispersing group; or ii) utilising monomers bearing selected reactive groups and which monomer is subsequently reacted with a compound carrying a hydrophilic water-dispersing group and also a reactive group of the type which will react with the selected reactive groups on the oligomer(s) to provide attachment of the hydrophilic water-dispersing group to the oligomer(s) via covalent bonding.

An organic solvent may optionally be added before or after the polymerisation process for making the oligomer(s) to control the viscosity. Examples of solvents include water-miscible solvents such as N-methylpyrrolidone, glycol ethers such as butyldiglycol and dialkyl ethers of glycol acetates or mixtures of N-methylpyrrolidone and methyl ethyl ketone. Optionally no organic solvents are added.

The oligomer(s) may be dispersed in water using techniques well known in the art. The crosslinkable oligomer(s) normally do not require the use of an external surfactant when being dispersed into water, although surfactants and or high shear can be utilised in order to assist in the dispersion of the oligomer(s) in water (even if the oligomer(s) is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount used is preferably 0 to 9%, still more preferably 0 to 5% by weight, most preferably 0.1 to 3% by weight and especially 0.3 to 2% by weight based on the weight of the total binder material.

For the purpose of Equation 1 the surfactants with a molecular weight of $\leq 1000$ are regarded as plasticisers and the surfactants with a molecular weight of $>1000$ are regarded as a non-crosslinkable oligomer(s).

The oligomer(s) preferably has an acid value of in the range of from 0 to 100 mg KOH/g, more preferably in the range of from 0 to 55 mgKOH/g, still more preferably in the range of from 0 to 30 mg KOH/g and most preferably in the range of from 10 to 30 mg KOH/g.

The glass transition temperature (Tg) of the oligomer(s) may vary within a wide range. The Tg (as measured by modulated DSC) is preferably in the range of from −120 to 250° C., more preferably in the range of from −120 to 100° C., still more preferably in the range of from −90 to 40° C., especially in the range of from −75 to 25° C. and most especially in the range of from −65 to 10° C.

The water-dispersible oligomer(s), if a polyurethane oligomer(s), may be prepared in a conventional manner by reacting an organic polyisocyanate(s) with an isocyanate-reactive compound(s). Methods for preparing polyurethanes are known in the art and are described in for example the Polyurethane Handbook 2$^{nd}$ Edition, a Carl Hanser publication, 1994, by G. Oertel; and these methods are included herein by reference.

Suitable polyisocyanates include aliphatic, cycloaliphatic, araliphatic, aromatic and/or polyisocyanates modified by the introduction of urethane, allophanate, urea, biuret, carbodiimide, uretonimine, urethdione or isocyanurate residues. Examples of suitable polyisocyanates include ethylene diisocyanate, 1,6-hexamethylene diisocyanate, isophorone diisocyanate, cyclohexane-1, 4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, 1,5-naphthylene diisocyanate and mixtures thereof.

Isocyanate-reactive organic compounds optionally bearing crosslinker groups (such as unsaturated fatty acid groups) and/or hydrophilic water-dispersing groups preferably contain at least one (preferably at least two) isocyanate-reactive groups, (isocyanate-reactive groups include —OH, —SH, —NH—, and —$NH_2$) and are more preferably organic polyols. The organic polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes.

When an isocyanate-terminated polyurethane prepolymer is prepared, it is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.1:1 to about 6:1, preferably from about 1.5:1 to 3:1.

Alternatively a hydroxyl-terminated polyurethane oligomer(s) may be prepared directly by reacting the reactants in proportions corresponding to a ratio of isocyanate groups to isocyanate-reactive groups of from about 0.4:1 to about 0.99:1, preferably from about 0.55:1 to 0.95:1.

If desired, catalysts such as dibutyltin dilaurate and stannous octoate, zirconium or titanium based catalysts may be used to assist polyurethane oligomer(s) formation.

An aqueous polyurethane oligomer(s) dispersion may be prepared by dispersing the isocyanate-terminated polyurethane prepolymer in an aqueous medium and chain extending the prepolymer with active hydrogen-containing chain extender in the aqueous phase. Active hydrogen-containing chain extenders which may be reacted with the isocyanate-terminated polyurethane prepolymer include amino-alcohols, primary or secondary diamines or polyamines such as ethylene diamine, hydrazine, and substituted hydrazines such as dimethyl hydrazine. Water itself may be effective as an indirect chain extender.

The total amount of chain extender and chain terminating materials employed (apart from water) should be such that the ratio of active hydrogens in the chain extender(s) to isocyanate groups in the polyurethane prepolymer preferably is in the range from 0.1:1 to 2.0:1 more preferably 0.80:1 to 1.7:1.

The polyurethane oligomer(s) has at least one glass transition temperature (Tg) as measured by modulated differential scanning calorimetry (DSC), preferably being in the range of from −100 to 250° C., more preferably −80 to 150° C. and most preferably −70 to 130° C. and especially −70 to 30° C.

The polyurethane oligomer(s) preferably has an acid value in the range of from 0 to 50 mg KOH/g, more preferably in the range of from 0 to 40 mg KOH/g and most preferably in the range of from 10 to 35 mg KOH/g.

The water-dispersible oligomer(s), if a polyester oligomer(s), may be prepared using conventional polymerisation procedures known to be effective for polyester synthesis. General processes for the preparation of alkyd polyesters are described in "Alkyd Resin Technology" by T C Patton, Publisher John Wiley & sons Inc. (1962). General methods for preparing crosslinkable polyesters are also disclosed in EP 486092, U.S. Pat. Nos. 3,494,882, US 4,251,406, EP 0000087, WO 95/02019, U.S. Pat. No. 5,378,757 and GB 2306489. Thus, it is well known that polyesters, which contain carbonyloxy (i.e. —C(=O)—O—) linking groups may be prepared by a condensation polymerisation process in which monomer(s) providing an "acid component" (including ester-forming derivatives thereof) is reacted with monomer(s) providing a "hydroxyl component". The monomer(s) providing an acid component may be selected from one or more polybasic carboxylic acids such as di- or tri-carboxylic acids or ester-forming derivatives thereof such as acid halides, anhydrides or esters. The monomer(s) providing a hydroxyl component may be one or more polyhydric alcohols or phenols (polyols) such as diols, triols, etc. It is to be understood, however, that the polyester oligomer(s) may contain, if desired, a proportion of carbonylamino linking groups —C(=O)—NH— (i.e. amide linking group) by including an appropriate amino functional reactant as part of the hydroxyl component or alternatively all of the hydroxyl component may comprise amino functional reactants, thus resulting in a polyamide oligomer; such amide linkages are in fact useful in that they are more hydrolysis resistant.

There are many examples of carboxylic acids (or their ester forming derivatives) which can be used in polyester oligomer(s) synthesis for the provision of the monomer(s) providing an acid component. Examples include, but are not limited to monofunctional acids such as (alkylated) benzoic acid and hexanoic acid; and $C_4$ to $C_{20}$ aliphatic, alicyclic and aromatic dicarboxylic acids (or higher functionality acids) or their ester-forming derivatives (such as anhydrides, acid chlorides, or lower alkyl esters). Specific examples include adipic acid, fumaric acid, maleic acid, succinic acid, itaconic acid, azeleic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, fatty acid dimers, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Similarly there are many examples of polyols which may be used in polyester oligomer(s) synthesis for the provision of the monomer(s) providing a hydroxyl component. The polyol(s) preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane (TMP) and 1,1,1-tris (hydroxymethyl)ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane).

The esterification polymerisation processes for making the polyester oligomer(s) for use in the invention composition are well known in the art and need not be described here in detail. Suffice to say that they are normally carried out in the melt using catalysts such as tin-based catalysts and with the provision for removing any water (or alcohol) formed from the condensation reaction.

The water-dispersible oligomer(s), if a vinyl oligomer(s), may be prepared from free radically polymerisable olefinically unsaturated monomer(s), and can contain polymerised units of a wide range of such monomers, especially those commonly used to make binders for the coatings industry. By a vinyl oligomer herein is meant a homo- or co-oligomer derived from addition polymerisation, using a free radical initiated process which may be carried out in an aqueous or non-aqueous medium, of one or more olefinically unsaturated monomers. Therefore by a vinyl monomer is meant an olefinically unsaturated monomer.

Examples of vinyl monomers which may be used to form a vinyl oligomer (or precursor vinyl oligomer) include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

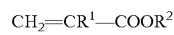

$$CH_2=CR^1-COOR^2$$

wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic, sulphonic and/or dicarboxylic acids, such as acrylic acid, methacrylic acid, β-carboxy ethyl acrylate, fumaric acid and itaconic acid, (meth)acrylamide, methoxypolyethyleneoxide(meth)acrylate may also be used.

The vinyl monomer may optionally contain functional groups to contribute to the crosslinking of the vinyl polymer(s) in the coating. Examples of such groups include maleic, epoxy, fumaric, acetoacetoxy, β-diketone, unsaturated fatty acid acryloyl, methacrylol, styrenic, (meth)allyl groups, mercapto groups, keto or aldehyde groups (such as methylvinylketone, diacetoneacrylamide and (meth)acrolein).

Particularly preferred is a vinyl oligomer made from a monomer system comprising at least 40 weight % of one or more monomers of the formula $CH_2=CR^1COOR^2$ as defined above. Such a preferred vinyl oligomer is defined herein as an acrylic oligomer. A particularly preferred vinyl oligomer(s) is an acrylic oligomer(s) (i.e. based predominantly on at least one ester of acrylic or methacrylic acid). More preferably, the monomer system contains at least 50 wt. % of such monomers, and particularly at least 60 wt. %. The other monomer(s) in such acrylic oligomer(s) (if used) may include one or more of the other vinyl monomers mentioned above, and/or may include ones different to such other monomers. Particularly preferred monomers include butyl acrylate (all isomers), butyl methacrylate (all isomers), methyl methacrylate (all isomers), ethyl hexyl methacrylate, esters of (meth)acrylic acid, acrylonitrile, vinyl acetate and styrene.

The glass transition temperature (Tg) of the vinyl oligomer(s) may vary within a wide range. The Tg of a vinyl oligomer(s) (preferably the Tg of a the vinyl oligomer(s) before functionalisation with fatty acid groups), as measured by modulated differential scanning calorimetry (DSC) is preferably in the range of from −90 to 120° C., more preferably in the range of from −70 to 80° C., most preferably in the range of from −60 to 60° C., and especially in the range of from −50 to 30° C.

The vinyl oligomer(s) of the composition of the invention preferably has an acid value of in the range of from 0 to 80 mg KOH/g, more preferably in the range of from 0 to 30 mg KOH/g most preferably in the range of from 10 to 30 mg KOH/g.

The vinyl oligomer(s) or is preferably prepared by free radical polymerisation, although in some circumstances anionic polymerisation may be utilised. The free radical polymerisation can be performed by techniques known in the art, for example as emulsion polymerisation, solution polymerisation, suspension polymerisation or bulk polymerisation.

A free-radical polymerisation of vinyl monomer(s) to form a crosslinkable vinyl oligomer(s) or precursor vinyl oligomer(s) will require the use of a free-radical-yielding initiator(s) to initiate the vinyl polymerisation. Suitable free-radical-yielding initiators include inorganic peroxides such as K, Na or ammonium persulphate, hydrogen peroxide, alkyl hydroperoxides such as t-butyl hydroperoxide and cumene hydroperoxide; dialkyl peroxides such as di-t-butyl peroxide and the like; mixtures may also be used. The peroxy compounds are in some cases advantageously used in combination with suitable reducing agents (redox systems) such as Na or K pyrosulphite or bisulphite, and iso-ascorbic acid.

It may be desirable to control the molecular weight by addition of a chain transfer agent to the free radical polymerisation process. Conventional chain transfer agents may be utilised and include mercaptans, sulphides, disulphides, triethylamine and halocarbons. In particular however the technique known as catalytic chain transfer polymerisation (CCTP) may be used to provide low molecular weights. In this case a free radical polymerisation is carried out using a free radical forming initiator and a catalytic amount of a selected transition metal complex acting as a catalytic chain transfer agent (CCTA), and in particular a selected cobalt chelate complex. Such a technique has been described for example in N. S. Enikolopyan et al, J. Polym. Chem. Ed., Vol 19, 879 (1981), U.S. Pat. Nos. 4,526,945, US 4,680,354, EP-A-0196783, EP-A-0199436, EP-A-0788518 and WO-A-87/03605.

The use of catalytic chain transfer agents provide 3 important benefits:

a) very low concentrations of catalytic chain transfer agent (typically 1 to 1000 ppm by weight of vinyl monomer used) are required to attain the preferred low molecular weight oligomer and do not have the odour often associated with conventional chain transfer agents;

b) a vinyl oligomer(s) prepared by CCTP contains a terminal unsaturated group on many, if not every vinyl oligomer molecule. This terminal unsaturation can participate in autoxidation reactions for example in fatty acid crosslinking systems. Thus the crosslinkable vinyl oligomer(s) of the present invention could have autoxidisable crosslinker groups comprising the unsaturated groups from fatty acids as well as terminal unsaturated groups resulting from CCTP.

c) CCTP allows the preparation of a vinyl oligomer(s) which has a narrower PDi than is achievable by the use of conventional chain transfer agents for low Mw oligomer(s). As discussed above, low PDi favours low viscosity in the bulk and in solution (for a given Mw), which in turn leads to longer open time and wet edge time.

The aqueous composition of the invention also includes a polymer dispersed therein, which is not a crosslinkable oligomer(s) or a non-crosslinkable oligomer(s) and is herein termed a dispersed polymer for convenience. The dispersed polymer has an L value $\geq 40 \times 10^4$, more preferably $\geq 68 \times 10^4$, especially $\geq 100 \times 10^4$ and most especially $\geq 130 \times 10^4$ when L is calculated according to Equation 1. The dispersed polymer(s) may be film forming or non-film forming at ambient temperature, preferably the dispersed polymer(s) is non-film forming at ambient temperature.

The oligomer(s) is thus combined with a dispersed polymer(s) to provide an aqueous composition with the desired balance of long open/wet edge time and reduced tack free time.

The dispersed polymer(s) may for example be the product of an aqueous emulsion polymerisation or a preformed polymer dispersed in water. (Also, in some cases, the synthesis to form the oligomer(s) may yield, in addition to the oligomer(s), an amount of very high molecular material with an L value $\geq 40 \times 10^4$. For the purposes of this invention, such material, produced in-situ, is to be considered as a dispersed polymer).

Preferably Mw of the dispersed polymer(s) in the aqueous composition is $\geq 110,000$, more preferably in the range of from 120,000 to 6,000,000, still more preferably in the range of from 120,000 to 2,000,000, most preferably in the range of from 150,000 to 2,000,000, and especially in the range of from 250,000 to 1,500,000 Daltons. If the dispersed polymer(s) is fully pre-crosslinked its Mw will be infinite. The Mw of the dispersed polymer may be <110,000 with the proviso that the L value for the dispersed polymer is $\geq 40 \times 10^4$ when calculated according to Equation 1 above.

Preferably the dispersed polymer(s) has a Tg measured using differential scanning calorimetry (DSC), which is in the range of from −50 to 300° C., more preferably in the range of from 5 to 200° C., most preferably in the range of from 25 to 200° C. especially in the range of from 35 to 125° C. and most especially in the range of from 60 to 100° C. If the dispersed polymer(s) is a vinyl polymer, the vinyl polymer may be a sequential polymer, i.e. the vinyl polymer will have more then one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. A simple blend of high and low Tg dispersed polymer(s) can be used to achieve the same or similar advantage. Blocking is the well-known phenomenon of coated substrates which are in contact tending to unacceptably adhere to each other, particularly when under pressure, as for example in doors or windows in their respective frames or when stacked.

Preferably the dispersed polymer(s) has an average particle size in the range of from 25 to 1000 nm, more preferably 60 to 700 nm, most preferably 120 to 600 nm and especially in the range of from 200 to 500 nm. Additionally, the particle size of the oligomer(s) is preferably at least 30 nm, more preferably at least 50 nm and most preferably at least 100 nm smaller than the particle size of the dispersed polymer(s).

The dispersed polymer(s) preferably has a low solubility in the aqueous medium of the composition of the invention, however some of the dispersed polymer(s) may be soluble (measurable by the centrifuge test described below). Preferably at least 30%, more preferably at least 60%, most preferably at least 90% by weight of the dispersed polymer(s) is present as insoluble polymer over the whole pH range.

The dispersed polymer(s) may for example be vinyl polymer, polyester, polyurethane, polyamide, polyepoxide, or a mixture thereof. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer.

The dispersed polymer(s) may optionally contain acid groups. The dispersed polymer(s) preferably has an acid value below 100 mgKOH/g, more preferably an acid value below 50 mg/KOH/g, most preferably an acid value below 25 mg KOH/g and especially an acid value below 15 mg KOH/g. The preferred acid value of the dispersed polymer(s) depend on the nature of the oligomer(s) and the amount of co-solvent in the aqueous composition of the invention. If the oligomer(s) is hydrophilic, the cosolvent used is preferably also of a hydrophilic nature and a low acid value of the dispersed polymer(s) is preferred (preferred below 60, more preferred below 40, more preferred below 30, more preferred below 24, more preferred below 19, more preferred below 15 mg KOH/g). If however a hydrophobic non-self dispersing oligomer(s) is used, for instance based on (at least partly) unsaturated fatty acid and with an insufficient level of dispersing groups, to generate a dispersion in water without the use of additional surfactants, the cosolvent is preferentially of hydrophobic nature (if at all present) and therefore much higher acid values (up to an acid value of 160, more preferred up to 125, most preferred up to 100 mg KOH/g) of the dispersed polymer(s) may be tolerated to give the desired properties.

In a special embodiment, 0 to 15 wt. % of a co-solvent based on the total binder material is used, where the dispersed polymer(s) has an acid value below 20 mg KOH/g and the crosslinkable oligomer(s) is present in an amount (based on total bindermaterial) of 30 to 60 wt. %, and the crosslinkable oligomer(s) comprises 45 to 70 wt. % of fatty acid groups.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 weight %, more preferably below 0.5 weight % and most preferably below 0.2 weight % based on the weight of the vinyl polymer.

The dispersed polymer(s) may optionally contain amide groups (such groups being for example obtainable from amide functional monomers such as (meth)acrylamide). If the dispersed polymer(s) is a vinyl polymer comprising polymerised (meth)acrylic monomers, then preferably the amide group content in the vinyl polymer is below 3.0 weight %, more preferably below 1.5 weight % and most preferably below 0.6 weight % based on the weight of the vinyl polymer.

The dispersed polymer(s) may optionally contain wet-adhesion promoting groups such as acetoacetoxy groups; (optionally substituted) amine or urea groups, for example cyclic ureido groups, imidazole groups, pyridine groups, hydrazide or semicarbazide groups. The dispersed polymer(s); if it contains for example carboxylic acid groups, can also be reacted with cyclic imines for example ethyleneimine or propyleneimine groups to improve its wet-adhesion properties and/or to introduce crosslinker groups.

The dispersed polymer(s) may optionally contain crosslinker groups which allow crosslinking of the dispersed polymer(s) and/or allow participation in the crosslinking reaction of the crosslinkable oligomer(s), thus speeding up the drying rate and improving the properties of the final coating (e.g. chemical resistance and scratch resistance).

Examples of such crosslinker groups include groups which can take part in the autoxidation and groups which will effect crosslinking other than by autoxidation, for example, Schiff base and silane condensation reactions as discussed above for oligomer(s).

In a preferred embodiment the dispersed polymer(s) may contain crosslinker groups which can participate in the preferred autoxidative crosslinking reactions of an autoxidisably crosslinkable oligomer(s).

In a preferred embodiment the dispersed polymer(s) may be partially or fully pre-crosslinked. If the dispersed polymer(s) is a vinyl polymer pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate. Allyl methacrylate is most preferred. Alternatively very low levels of initiator may be used, leading to chain-transfer to the vinyl polymer and hence to grafting and high Mw. Other ways to generate pre-crosslinking in a vinyl polymer is to include the use of monomers bearing groups which may react with each other during synthesis to effect pre-crosslinking for example glycidylmethacrylate and acrylic acid.

Examples of vinyl monomers which may be used to form vinyl dispersed polymer(s) include the vinyl monomers listed above for the preparation of vinyl oligomer(s).

If the dispersed polymer(s) is a vinyl dispersed polymer, the vinyl dispersed polymer optionally comprises at least 15 wt. %, more preferably at least 40 wt. % and most preferably at least 60 wt. % of polymerised vinyl acetate. If the vinyl dispersed polymer comprises at least 50 wt. % of polymerised vinylacetate then preferably the vinyl dispersed polymer also comprises 10–49 wt % of either butylacrylate or a branched vinylester, for example Veova 10.

In a preferred embodiment the vinyl dispersed polymer comprises:

I. 15 to 60 wt. % of styrene and/or α-methylstyrene;
II. 15 to 80 wt. % of alkyl(meth)acrylate ester(s) which would give a homopolymer with a Tg as calculated by the Flory Fox equation in the range of from 30 to 110° C.;
III. 0 to 5 wt. % of vinyl monomer containing carboxylic acid groups;
IV. 0 to 10 wt. %, more preferably 0 to 5 wt. % of a vinyl monomer containing a non-ionic water-dispersing group(s);
V. 0 to 8 wt. %, more preferably 0 to 4 wt. %, and most preferably 0.5 to 3 wt. % of a polyethylenically unsaturated vinyl monomer(s);
VI. 0 to 5 wt. % of vinyl monomers containing wet adhesion promoters or crosslinker groups (excluding any within the scope of III and V); and
VII. 5 to 40 wt. % of vinyl monomers other than as in I to VI, wherein I)+II) add up to at least 50 wt. % and I+II+III+IV+V+VI+VII add up to 100%.

The dispersed polymer(s) can be prepared by any known technique. Preparation techniques include either dispersing a pre-formed polymer or polymer solution in water or if the dispersed polymer(s) is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology, volume 66, number 839, pages 89–105 (1995) and these methods are included herein by reference. Preferably vinyl dispersed polymer(s) are prepared by the emulsion polymerisation of free radically polymerisable olefinically unsaturated monomers (Emulsion Polymerisation and Emulsion Polymer, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300–700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165, 1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (see for example M J Schick, M Dekker Inc 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example D H Craig, Journal of Coatings Technology 61, no. 779, 48, 1989). Hydrophilic stabilising groups may also be introduced into a preformed polymer before it is subsequently dispersed in water, as described in EP 0317258 where polyethylene oxide groups are reacted into a polyester polymer which is subsequently dispersed in water and then chain extended.

The combination of oligomer(s) and dispersed polymer(s) is most conveniently prepared by physically blending the corresponding aqueous dispersions. However other methods of preparing the combination can sometimes be utilised. One such method is to prepare the oligomer(s) in solution as previously discussed, and to disperse this solution directly into a dispersed polymer(s). Alternatively the solvent can be removed from the oligomer(s) solution, and the dry oligomer(s) is directly dispersed into a dispersed polymer(s). Another method is to introduce the crosslinkable oligomer(s) into an aqueous free radical polymerisation reaction which produces the dispersed polymer(s). Such an introduction of oligomer(s) can either be at the commencement of the aqueous free radical polymerisation or during an aqueous free radical polymerisation. (A dispersed polymer can sometimes be formed in-situ from the synthesis of an oligomer(s) as a very high molecular weight fraction resulting from the oligomer(s) synthesis)

The oligomer(s) may also be diluted with reactive diluent (for example vinyl monomers) at any stage of its preparation and then dispersed into a dispersed polymer(s), followed by polymerisation of the reactive diluent in the presence of the oligomer(s) and the optional polymer dispersion(s). Optionally, depending on the nature of the reactive diluent, no further polymerisation of the reactive diluent prior to use in a coating may be required.

Alternatively the oligomer(s) and dispersed polymer(s) may be combined by preparing a redispersible dry powder form of the dispersed polymer(s), and then dispersing the redispersible dry powder directly into an aqueous dispersion of the oligomer(s). Methods for preparing redispersible dry powders from polymer emulsions are described for example in U.S. Pat. No. 5,962,554, DE 3323804 and EP 0398576.

In an embodiment of the invention the oligomer(s) and the dispersed polymer(s) are compatible in the drying aqueous composition. Preferably the oligomer(s) and the dispersed polymer(s) give clear films upon film formation after coating of the aqueous composition onto a substrate.

Preferably the ratios by weight of solid material of crosslinkable oligomer(s) to the dispersed polymer(s) is in the range of from 90:10 to 10:90, more preferably in the range of from 80:20 to 15:85, especially in the range of from 65:35 to 25:75 and most especially in the range of from 60:40 to 30:70.

Preferably the swelling of the dispersed polymer(s) due to the presence of water and optionally solvent is $\leq 80$ vol. %, more preferably $\leq 60$ vol. %, still more preferably $\leq 45$ vol. %, especially $\leq 30$ vol. %, more especially $\leq 15$ vol. % and most especially $\leq 8$ vol. % when compared to the unswollen state of the dispersed polymer.

Preferably the actual binder material solids content (in weight %)×(Fp×(1+swelling %/100)+(1−Fp)) is <72%, more preferably <65%, most preferably <60% and especially <55%. (The actual binder material solids content= (weight % of dispersed polymer(s)×solids % of dispersed polymer(s))+(weight % of oligomer(s)×solids % of oligomer(s)). If more than one dispersed polymer or more than oligomer is present then each individual "weight %×solids %" is added together). Fp is defined as [(weight fraction dispersed polymer×solids % dispersed polymer )/actual binder material solids content].

The aqueous coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition. The invention composition can contain co-solvent or a mixture of co-solvents in the concentration range 0 to 25% by weight. Preferably the invention composition contains less than 18% by weight of co-solvents, more preferably less than 10%, still more preferably less than 5%, especially less than 3% and most especially 0% by weight based on the invention composition. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of the oligomer(s) and or the dispersed polymer(s) or may have been added during formulation of the aqueous composition.

In a special embodiment, the amount of co-solvent used in the invention composition is preferably linked to the Mw of the oligomer(s) in the composition. For oligomer(s) with Mw in the range 1,000 to 50,000 Daltons, the amount of co-solvent is preferably 0 to 15 wt. % based on the weight of the composition, more preferably 0 to 10 wt. %. For oligomer(s) with Mw in the range 50,000 to 100,000 Daltons, the corresponding figures for the preferred amount of co-solvent are 0 to 25 wt. %, more preferably 5 to 20 wt. %.

Furthermore, there is also a preferred relationship between the amount of co-solvent used and the amount of binder polymer solids, viz the amount of co-solvent is preferably $\leq 50$ wt. % based on the weight of binder polymer solids in the composition, more preferably $\leq 35$. wt %, more preferably $\leq 20$ wt. %, more preferably $\leq 10$ wt. %, and especially preferably 0 wt %.

An advantage of the current invention is that co-solvent can, as is often required for environmental and safety reasons, be present at a very low concentrations because of the plasticising nature of the oligomer(s). Preferably the solvent to water ratio is below 1.0, more preferably below 0.5, most preferably below 0.3 and especially below 0.15. The co-solvent(s) can all be added at the final formulation step. Alternatively some or all of the co-solvent in the final formulation can be the co-solvent utilised in the preparation of the oligomer(s). An important consideration when choosing a co-solvent is whether or not the co-solvent is compatible with the oligomer(s) and/or the dispersed polymer(s) and the effect of any co-solvent partitioning (and the partitioning of the co-solvent in the (aqueous) oligomer(s) phase versus the dispersed polymer particles is preferably >1/1, more preferably >2/1 and most preferably >3/1). If the co-solvent is more compatible with the polymer it will swell the polymer, thus increasing the overall viscosity. Preferably any co-solvent present in the aqueous composition of the invention is more compatible with the oligomer(s) then with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the polymer and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519–559, 1989) and by D W Van Krevelen and P J Hoftyzer in "Properties of Polymers. Correlations With Chemical Structure" (Elsevier, New York, 1972 chapters 6 and 8). Co-solvent uptake of the dispersed polymer(s) may be decreased by increasing the Tg so that the dispersed polymer(s) is in the glassy region at ambient temperature, or by pre-crosslinking the dispersed polymer(s) as described above. Other ways of introducing pre-cross linking into dispersed polymer(s) are known in the art, for example U.S. Pat. No. 5,169,895 describes the preparation of pre-crosslinked polyester aqueous dispersions by the use of tri-functional isocyanates in the synthesis.

A known problem with many autoxidisable coating compositions is that the resultant coatings have a tendency to yellow, in particular where the autoxidisable groups are derived from polyunsaturated fatty acids, such as for example tung oil, linolenic acid, oleostearic acid, arachidonic acid, clupanadonic acid, and fatty acids obtainable from dehydrated castor oil. This may be unacceptable depending on the desired colour of the resultant coating. Preferably the aqueous composition has a starting yellowness value of less than 10, more preferably less than 7 and most preferably less than 4, when measured using the test method described herein. Preferably the aqueous composition has an increase in yellowing in darkness and after 2 weeks of less than 7, more preferably less than 5, most preferably less than 3 and preferably the aqueous composition has an increase in yellowing in daylight of preferably less than 12, more preferably less than 8 and most preferably less than 4 as measured by the test method described herein.

Furthermore, the absolute yellowness (i.e yellowness at start plus yellowness due to ageing) of the aqueous composition is preferably less than 12, more preferably less than 10, still more preferably less than 8 and especially less than 6.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating. Accordingly in a further embodiment of the invention there is provided a coating obtainable from an aqueous coating composition of the present invention.

The aqueous coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents, waxes, neutralising agents, adhesion promoters, defoamers, co-solvents, wetting agents and the like introduced at any stage of the production process or subsequently. It is possible to include an amount of antimony oxide in the dispersions to enhance the fire retardant properties. Optionally external crosslinking agent(s) may be added to the aqueous composition of the invention to aid crosslinking during drying. Examples of reactive functional groups which may be utilised for external crosslinking agent(s) include but are not limited to hydroxyl functional groups reacting with isocyanate (optionally blocked), melamine, or glycouril functional groups; keto, aldehyde and/or acetoacetoxy carbonyl functional groups reacting with amine or hydrazine functional groups; carboxyl functional groups reacting with aziridine, epoxy or carbodiimide functional groups; silane functional groups reacting with silane functional groups; epoxy functional groups reacting with amine or mercaptane groups as well as carboxyl functional groups undergoing metal ion (such as zinc) crosslinking.

In particular, the aqueous coating compositions of the invention and formulations containing them if containing autoxidisable oligomer(s) advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable oligomer(s) and or autoxidisable dispersed polymer(s).

Drier salts are conventionally supplied as solutions in solvents for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2'-bipyridyl and 1,10-phenanthroline.

In an embodiment of the present invention there is provided an aqueous coating composition comprising:

i) 3 to 26% of a crosslinkable oligomer(s) by weight of the composition;

ii) 0 to 6.5% of a non-crosslinkable oligomer(s) by weight of the composition;

iii) 10 to 56% of dispersed polymer(s) by weight of the composition;

iv) 0 to 15% of co-solvent by weight of the composition;

v) 5 to 65% of water by weight of the composition;

where i)+ii)+iii)+iv)+v)=100%.

In another embodiment of the present invention there is provided an aqueous coating composition comprising:

i) 14 to 40% of a crosslinkable oligomer(s) by weight of binder material;

ii) 0 to 10% of a non-crosslinkable oligomer(s) by weight of binder material;

iii) 50 to 85% of dispersed polymer(s) by weight of binder material;

where i)+ii)+iii)=100%.

If desired the aqueous dispersion of the invention can be used in combination with other polymer dispersions or solutions which are not according to the invention.

FIG. 1 shows the drying profile when measured over an average of 5 successive scratches.

FIG. 2 shows the drying profile when measured over an average of 8 successive scratches.

Figure 1:
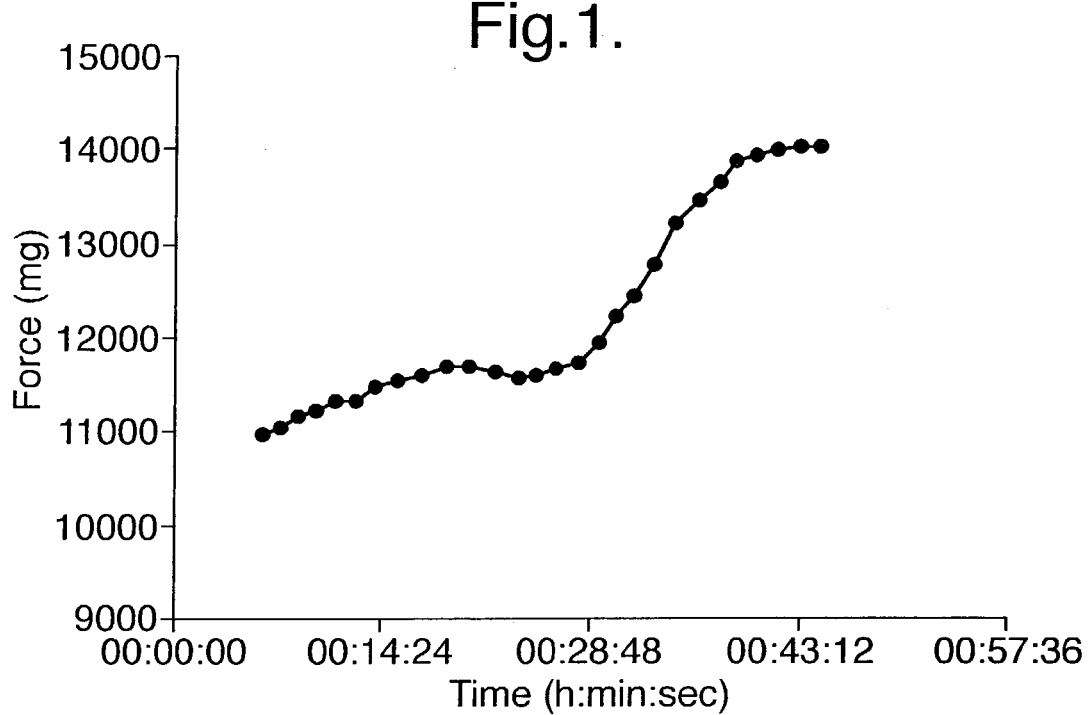
FIGS. 1 and 2 illustrate the drying profile of a composition according to present invention (Example 1) using a Thin Film Analyser as described above and below.
Figure 2:
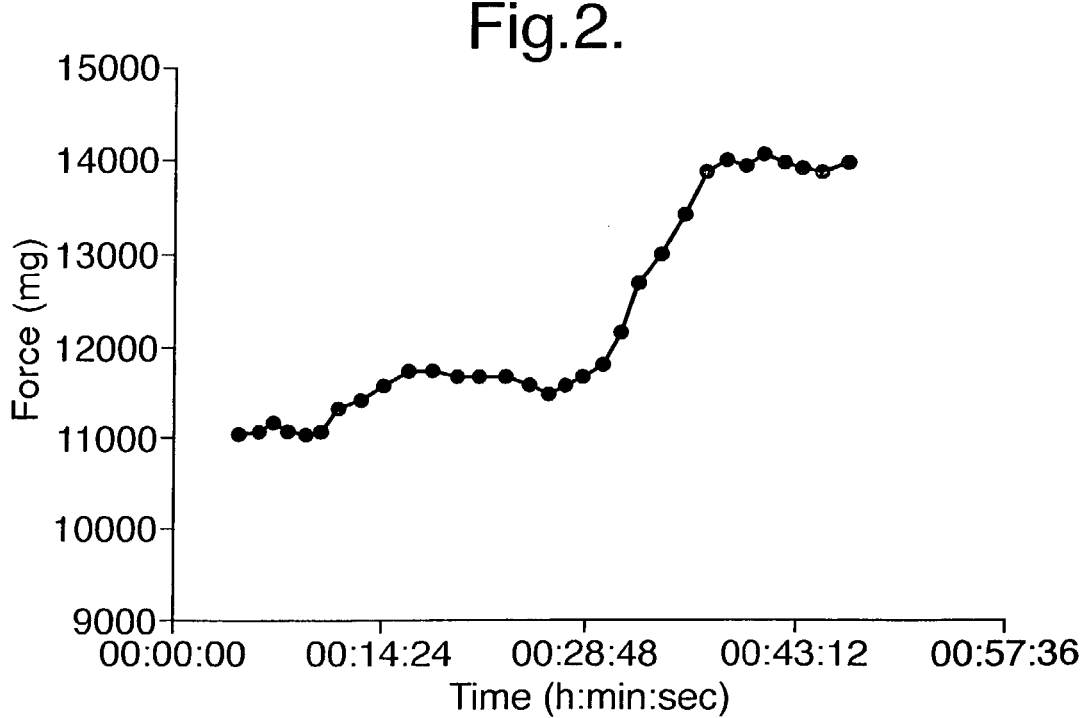

The present invention is now illustrated by reference to the following examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

Materials & Abbreviations Used:

| | |
|---|---|
| DEA | N,N-diethanolamine |
| DMEA = | N,N-dimethylaminoethanol |
| MPEG750 = | methoxypolyethylene glycol (Mn approximately 750) |
| DMPA = | dimethylolpropionic acid |
| NMP = | N-methyl pyrrolidone |
| TDI = | toluene diisocyanate |
| Dowanol DPM = | dipropylene glycol monomethyl ether |
| DAPRO5005 = | drier salt available from Profiltra |
| 1,4-CHDM = | 1,4-cyclohexanedimethanol |
| Voranol P-400 = | polypropyleneglycol available from DOW Chemical |
| Silquest A1310 = | NCO functional silane component available from CK Witco Corporation |
| Silquest A-174NT = | methacryl functional silane component available from CK Witco Corporation |
| TEA = | triethylamine |
| Boltorn H20 = | Dendritic oligomer available from Perstorp |
| Nouracid LE80 = | linseed oil fatty acid available from AKZO Nobel |
| Fastcat 2005 = | tin(II)chloride available from Elf-Atochem |
| Atlas G4809 = | Alkyl phenol alkoxylate available from ATLAS Chemie (70%) |
| Atlas G5000 = | Alkyl alkoxylate available from ATLAS Chemie (100%) |
| Atpol E5720/20 = | Fatty alcohol ethoxylate available from Uniqema |
| AP = | ammonium persulphate |
| Aerosol OT-75 = | Sodium dioctylsulphosuccinate available from Cytec |
| MMA = | methylmethacrylate |
| n-BA = | n-butylacrylate |
| AA = | acrylic acid |
| SLS = | Sodium Lauryl Sulphate |
| Akyposal NAF = | Sodium dodecylbenzenesulphonate available from KAO Chemicals |
| Natrosol 250LR = | Hydroxy ethyl cellulose available from Hercules |
| VeoVa 10 = | Vinyl ester of versatic acid available from Shell |
| Desmodur W = | dicyclohexyl methane diisocyanate available from Bayer |
| Priplast 3192 = | Dimeric acid polyester polyol available from Uniqema |

-continued

| | |
|---|---|
| BMA = | n-butyl methacrylate |
| t-BHPO = | t-butyl hydroperoxide |
| Fe$^{III}$.EDTA = | ferric ethylene diamine tetracetic acid |
| IAA = | isoascorbic acid solution |
| STY = | Styrene |
| OMKT = | n-octyl mercaptane |
| TAPEH = | tert-amylperoxy-2-ethyl hexanoate |
| Water = | demineralised water |
| AMP-95 = | 2-amino-2-methyl-1-propanol (available from Intergrated Chemicals bv) |
| Dehydran 1293 = | Defoamer additive (available from Cognis, 10% in BG) |
| Surfynol 104E = | Wetting agent (available from Air Products, 50% in EG) |
| NeoCryl BT-24 = | Acrylic emulsion polymer (available from NeoResins, Avecia bv) |

Thin Film Analyser Experiments

The Thin Film Analyser (TFA), supplied by Rhopoint (Bexhill, UK), was used to determine the drying profile of aqueous coating compositions prepared in the Examples below. The TFA is computer-controlled and consists of a probe attached to an arm, which is moved and controlled by a computer. A scratch was obtained by pushing the probe through a drying paint film. The computer controlled the probe and registered the force that the probe experienced upon moving through the drying film. The force that the probe experienced in the film is related to the viscosity of the film and to the open time of the coating composition.

All TFA measurements were performed at an air humidity level of 50±5%, a temperature of 23±1° C. and an air flow of ≦0.1 m/s. The TFA settings and equipment were applied as follows: the testing arm was equipped with a set of three weights:

1. 3.5 grams at the back of the testing arm;
2. 7.0 grams just above the probe at the font of the testing arm;
3. 10.0 grams on top of the testing arm;

A cylindrical probe was used (1.5 g, 5 mm wide, 6 mm diameter), along with a scratch speed of 1.0 cm/s, a scratch length of 4.0 cm, and a distance of 1.0 mm between the probe and the drying coating when the TFA is at rest.

All aqueous coating compositions prepared in the Examples below that were tested, were thickened (by using Borchigel L75N) to a viscosity of 4,000 to 6,000 mPa·s, as measured with a Brookfield rheometer RVT, using spindle number 5, at 100 rpm. The compositions were subsequently left undisturbed for 24 hours, then stirred up to mix the contents intimately, checked (and when necessary corrected) for their viscosity, and finally is tested.

Each thickened aqueous coating compositions was applied to a test chart (18×24 cm, form 8B-display, available from Leneta Company) that was glued on a glass plate to prevent it from curving due the coating composition. The composition was applied using a wire rod, resulting in a wet film thickness of 120 μm, and the actual wet film thickness (and its uniformity) was checked with a wet film gauge, 20–370 μm, of Braive Instruments.

The coated test chart on glass plate was subsequently placed on the TFA and the initial force ($F_0$; the force measured at t=0) was set to a value in between 3500 and 11,000 mg, more preferably between 7000 and 11000. The TFA measurement was started and scratches were performed in approximately 1 minute time intervals. It is essential that the film stays in a liquid, viscous state during the TFA measurement to obtain reliable values: when the film reaches its dust free time the probe starts scratching the surface of the film and the obtained values no longer have a physical meaning.

Test Methods:

To test for the open time and wet edge time of the aqueous compositions prepared as described in the examples below, the aqueous composition was applied using a wire rod to a test chart (18×24 cm, form 8B-display, available from Leneta Company) at a wet film thickness of 120 μm. Open time and wet edge time tests were performed at fairly regular time intervals according to the approximate expected final times in each case (being determined roughly from a trial run), the intervals between measurements decreasing towards the end of the run. The measurements were carried out at relative humidity levels of 50+/−5%, temperatures of 23+/−2° C. and an air flow ≦0.1 m/s.

Open Time:

The open time was determined by brushing at regular time intervals (as mentioned above) a virgin 75 cm$^2$ area of the coated chart with a brush (Monoblock no 12, pure bristles/polyester 5408-12) carrying some more of the composition with a brush pressure of 100–150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate the open time was considered to be over.

Wet Edge Time:

The wet edge time was determined by brushing at regular time intervals (as mentioned above) a virgin 25 cm$^2$ edge area of the coated chart with a brush (Monoblock no 12, pure bristles/polyester 5408-12) carrying some more of the composition with a brush pressure of 100–150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages of the aqueous compositions prepared in the Examples as described below, the aqueous composition was applied to a glass plate at a wet film thickness of 80 μm. Drying time tests were performed at regular time intervals at relative humidity levels of 50+/−5%, temperatures of 23+/−2° C. and an air flow ≦0.1 m/s.

Dust-Free Time:

The dust-free time was determined by dropping a piece of cotton wool (about 1 cm$^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-Free Time:

The tack-free time was determined by placing a piece of cotton wool (about 1 cm$^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-Hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Sandability

Sandability corresponds to the hardness of a coating at the point when a coating can be sanded properly. The composition prepared in the Examples described below was applied to a piece of wood at a wet film thickness of 120 μm. The coating was abraded by hand with sandpaper (grain delicacy P150) at regular time intervals at relative humidity levels of 50+/−5%, temperatures of 23+/−2° C. and an air flow <0.1 m/s. When there was no significant clogging (or the coating started powdering) the coating was considered to be sandable.

Water Solubility Determination by a Centrifuge Test:

A sample of for example a crosslinkable oligomer was dispersed in water and diluted with water/ammonia to 10% solids and the pH adjusted to the desired pH, within a range of from 2 to 10, and the dispersion was then centrifuged over 5 hours at 21000 rpm at 23±2° C. on a Sigma 3K30 Centrifuge (where 21,000 rpm corresponds to a centrifugal force of 40,000 g). The pH chosen should be the pH where the crosslinkable oligomer is expected to be most soluble, for example often a pH of about 9 is suitable for anionic stabilised dispersions and a pH of about 2 is often suitable for cationic stabilised dispersions. After centrifugation a sample of the supernatant liquid was taken and evaporated for 1 hour at 105° C. to determine the solids content of the supernatant liquid. The water solubility percentage was calculated by dividing the amount of solids (in gram) of the supernatant by the total amount of solids put in the centrifuge tube and multiplying this by 100.

Viscosity:

The viscosity of the aqueous composition of the invention was measured on a commercial rheometer (for example a TA Instruments AR1000N rheometer using a 6 cm/2 degree cone and plate, or cup and spindle measuring geometry). The viscosity of the oligomer(s) was measured on a Bohlin viscometer using a cup-and-spindle (C14), plate-and plate or cone-and-plate (CP5/30).

Measurement of Film Yellowing:

The yellowing of a coating exposed to daylight or darkness for a specified time period was determined using a Tristimulus Colorimeter consisting of a data-station, a micro-colour meter, a calibration plate with a defined x, y and z value and a printer. The equipment was calibrated to the defined values of the calibration plate and then colour co-ordinate b was measured. The colour co-ordinates define the brightness and colour on a colour scale, where 'b' is a measure of yellowness (+b) or blueness (−b), (the more yellow the coating, the higher the 'b' value). The co-ordinate 'b' approaches zero for neutral colours (white, grays and blacks). The higher the values for 'b' are, the more saturated a colour is.

The daylight-yellowing is defined as the increase of the yellowness (day Δb) of the coating during storage at 23±2° C. and in daylight for 28 days. The dark-yellowing is defined as the increase in the yellowness (dark Δb) of the coating during storage at 23±2° C. and in the dark for 14 days.

Molecular Weight Determination:

Gel permeation chromatography (GPC) analyses for the determination of polymer molecular weights were performed on an Alliance Waters 2690 GPC with two consecutive PL-gel columns (type Mixed-C, l/d=300/7.5 mm) using tetrahydrofuran (THF, HPLC grade, stabilized with 3,5-Di-tert-Butyl-4-Hydroxytoluene (BHT), preferably with 1.0 vol % acetic acid) as the eluent at 1 cm$^3$/min and using an Alliance Waters 2410 refractive index detector. A set of polystyrene standards (analysed according to DIN 55672) was used to calibrate the GPC. Samples corresponding to about 16 mg of solid material were dissolved in 8 cm$^3$ of THF. If dissolving the oligomer in THF is problematic, for example if a turbidsolution is obtained, or if the solution contains gel particles then the THF may be replaced with dimethylacetamide. The samples were regularly shaken and dissolved for at least 24 hours for complete "uncoiling" and placed on the auto-sampling unit of the Alliance Waters 2690. The injection volume was 150 μL and the column oven was established at 35° C.

As described above, all species with a molecular weight less than 1000 Daltons were ignored when calculating the Mw and PDi for the oligomer(s).

In the molecular weight determination of the oligomer, the GPC chromatogram is calculated from molecular weight 200 upwards (since all species with a molecular weight of less than 200 is being regarded as solvent). This results in an initial Mw and PDi value for the oligomer. The GPC fraction with a molecular weight of 200 to 999 is then subtracted from this chromatogram (since this represents the concentration of reactive diluent and/or plasticiser present in the composition), and the final Mw and PDi values (presented in Table 7 below) are recalculated from the remaining fraction (i.e. the fraction from Mw 1000 upwards).

Preparation of a Alkyd Polyol X1

The first step in the synthesis of self-crosslinkable polyurethane oligomers involves the preparation of an isocyanate-reactive material bearing crosslinker groups, the isocyanate-reactive groups being hydroxyl and the crosslinker groups being fatty acid groups. A 2-L 3-necked round bottom flask, equipped with a stirrer and a thermometer, was loaded with N,N-diethanolamine (DEA) (247.56 g), NaOMe (catalyst; 2.54 g) and sunflower oil (1248.08 g) in a nitrogen atmosphere. The hazy reaction mixture was stirred at 110 to 120° C. until a clear mixture was obtained (usually 2 to 6 h). Stirring at the given temperature was continued until a DEA-conversion of at least 85% was achieved, as determined by titration of residual amine functionality in the product with 1 N aqueous HCl. The product was then cooled to 70° C. and 85% aqueous phosphoric acid ($H_3PO_4$, 1.81 g) was added to neutralize the catalyst. The final alkyd polyol X1 was subsequently cooled to room temperature and stored under nitrogen.

Alkyd polyol X2 was prepared according to a similar procedure using the components presented in Table 1a below.

TABLE 1a

| Components (g) | X1 | X2 |
| --- | --- | --- |
| N,N-diethanolamine (DEA) | 247.56 | 287.30 |
| NaOMe | 2.54 | 3.54 |

TABLE 1a-continued

| Components (g) | X1 | X2 |
|---|---|---|
| Sunflower oil | 1248.08 | 1406.60 |
| $H_3PO_4$ | 1.81 | 2.53 |
| Total | 1499.99 | 1699.97 |
| OH-value (mgKOH/g) | 264.00 | 270.50 |
| DEA Conversion (%) | 94 | 89 |

Preparation of a Self-crosslinkable Autoxidisable Urethane Oligomer A1

A 1-L 3-necked round bottom flask, equipped with a stirrer and a thermometer, was loaded with a polyol mixture consisting of dimethylolpropanoic acid (DMPA; 19.36 g), N-methyl pyrrolidone (NMP; 92.50 g), methoxypolyethylene glycol (MPEG750; 18.879), cyclohexane dimethanol (CHDM; 8.97 g) and the alkyd polyol X1 described above (260.43 g). The reactor was purged with nitrogen and toluene diisocyanate (TDI; 99.89 g) was slowly fed into the stirred polyol mixture over a period of 2 h while the temperature of the reaction mixture was allowed to increase to 50° C. After complete addition of the TDI, the reaction mixture was stirred for an additional 15 min at 50° C. and subsequently heated to 80° C. and kept at this temperature for 1 hour. The resultant NCO-free alkyd urethane oligomer A1 was then cooled to 50° C. and stored under nitrogen. GPC analysis: Mw=4344; PDi=1.61. The viscosity of an 80% solids solution of A1 in NMP (50° C., shear rate 92.5 s$^{-1}$) was 10.9 Pa·s. The viscosity of a 70% solids solution of A1 in NMP/H$_2$O/DMEA (20/7/3) (23° C., shear rate 92.5 s$^{-1}$) was 6.6 Pa·s.

The crosslinkable urethane oligomers A2 and A3 and the non-crosslinkable urethane oligomer A4 were prepared according to a similar procedure using the components presented in Table 1b below.

TABLE 1b

| Components (g) | A1 | A2 | A3 | A4 |
|---|---|---|---|---|
| TDI | 99.89 | 76.58 | 363.50 | 274.46 |
| DMPA | 19.36 | 23.23 | 60.00 | 48.00 |
| 1.4-CHDM | 8.97 | 10.76 | — | — |
| MPEG750 | 18.87 | 22.64 | — | 19.20 |
| Voranol P-400 | — | — | — | 618.64 |
| Alkyd polyol X1 | 260.43 | — | — | — |
| Alkyd polyol X2 | — | 355.79 | 716.50 | — |
| NMP | 92.50 | 111.00 | 300.00 | 240.00 |
| Mw | 4344 | 2088 | 175134 | 10531 |
| PDi | 1.61 | 1.22 | 28.14 | 1.81 |

Preparation of a Crosslinkable Vinyl Oligomer A5

A 2L 3-necked round bottom reactor, equipped with stirrer and N$_2$ inlet, was loaded with toluene (310.50 g), glycidyl methacrylate (GMA; 90.00 g), MPEG350 methacrylate (MPEG MA; 60.00 g), n-butyl methacrylate (BMA; 100.00 g), methyl methacrylate (MMA; 50.00 gram), n-octyl mercaptane (OMKT; 7.50 g) and tert-amyl peroxy 2-ethylhexanoate (t-APEH; 3.00 g). The reaction mixture was flushed with nitrogen, stirred and subsequently heated to 80° C. This temperature was maintained during 3 hours after which the temperature of the mixture was raised to 110° C. for 60 minutes to finalise the acrylic polymerisation step. At 110° C., a mixture of Nouracid LE80 (169.40 g) and triethylamine (TEA; 0.60 g) were added and the resulting yellowish reaction mixture was heated at 140° C. under a positive nitrogen flow to distil off the solvent (toluene). The reaction mixture was stirred at 140° C. until an acid value of 5.1 mg KOH/g solids was obtained. The resulting oligomer A5 had a solids content of >99%. GPC analysis: Mw=14279, PDi=2.05. The viscosity of an 80% solids solution of A5 in NMP (50° C., shear rate 92.5 s$^{-1}$) was 0.02 Pa·s. The viscosity of a 70% solids solution of A5 in NMP/H$_2$O/DMEA (20/7/3) (23° C., shear rate 92.5 s$^{-1}$) was 0.05 Pa·s.

The crosslinkable vinyl oligomer A6 was prepared according to a similar procedure using the components presented in Table 1c below.

TABLE 1c

| Components (g) | A5 | A6 |
|---|---|---|
| GMA | 90.00 | — |
| type MPEG MA | 350 | 550 |
| Amount MPEG MA | 60.00 | 45.00 |
| MMA | 50.00 | — |
| BMA | 100.00 | — |
| Silquest A-174NT | — | 30.00 |
| IBMA | — | 105.00 |
| EMA | — | 120.00 |
| OMKT | 7.50 | 15.00 |
| TAPEH | 3.00 | 3.00 |
| Toluene | 310.50 | 318.00 |
| TEA | 0.60 | — |
| NourAcid LE80 | 169.40 | — |
| Mw | 14279 | 9403 |
| PDi | 2.05 | 2.03 |
| water solubility (%) | 4.2 | 1.7 |

Preparation of a Crosslinkable Polyester Oligomer A7

A 2 liter, five-necked reactor flask fitted with a stirrer, a thermometer and a condenser fitted with a Dean-Stark condensate trap, was loaded with adipic acid (156.49 g), Prifac 8961 (sunflower oil fatty acid, Trademark from Uniqema; 391.22 g), trimethylol propane (TMP; 78.24 g) and pentaerythritol (PE; 130.41 g) in a nitrogen atmosphere. The resulting slurry was heated to 210° C. under vigorous stirring and the reaction water was distilled off. After two hours of reaction time, a portion of Fastcat 2005 (stannous (II)chloride, Trademark from Elf-Atochem; 0.26 g) was added to the reaction mixture. After 6 hours reaction time the acid value had dropped to 6.5 mg KOH/g and the viscous mixture was cooled to 120° C. Then succinic anhydride (78.24 g) was added to the reaction mixture in one portion. The contents of the reactor were stirred at 120° C. until all the anhydride had reacted, as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). The resultant acid-functional polyester oligomer A7 was cooled to room temperature and collected. The oligomer had an acid value of 54.0 mg KOH/g. GPC analysis: Mw=39936; PDi=10.20. The viscosity of an 80% solids solution of A7 in NMP (50° C., shear rate 92.5 s$^{-1}$) was 0.5 Pa·s. The viscosity of a 70% solids solution of A7 in NMP/H$_2$O/DMEA (20/7/3) (23° C., shear rate 92.5 s$^{-1}$) was 1.1 Pa·s. A10 was prepared using a similar procedure as A7 using the components listed in Table 1d.

Preparation of a Poly-alkoxylated Adduct MPEG750/SAN

The first step in the synthesis of self-crosslinkable hyperbranched oligomers A8 and A9 involves the preparation of a carboxylic acid functional methoxy-polyethylene glycol. A 2-L 3-necked round bottom flask, equipped with stirrer, was loaded with methoxy-polyethylene glycol (Mn ca. 750;

1323.53 g) and succinic anhydride (176.47 g) in a nitrogen atmosphere. The reaction mixture was heated to 120° C., and was stirred at this temperature until all the anhydride had reacted, as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). The clear liquid product was then cooled to 50° C. and collected. The product solidified when left undisturbed at ambient temperature.

Preparation of a Crosslinkable Hyperbranched Polyester Macromolecule A8

A 2 liter, five-necked reactor flask fitted with a stirrer, a thermometer and a condenser fitted with a Dean-Stark condensate trap, was loaded with Boltorn H20 polyol (Trademark from Perstorp AB; 182.28 g), the MPEG750/SAN adduct as prepared above (351.33 g), Nouracid LE80 (linseed oil fatty acid, Trademark from AKZO Nobel; 345.96 g) and Fastcat 2005 (stannous(II) chloride, Trademark from Elf-Atochem; 0.25 g) in a nitrogen atmosphere. The reaction mixture was heated to 230° C. and water was collected. The mixture was kept at 230° C. until an acid value of 7.3 mg KOH/g polyester was obtained. The product oligomer A8 was then cooled to 50° C., collected and stored under nitrogen. GPC analysis: Mw=21399; PDi=5.09. The viscosity of an 80% solids solution in NMP (50° C., shear rate 92.5 s$^{-1}$) is 0.4 Pa·s. The viscosity of a 70% solids solution in NMP/H$_2$O/DMEA (20/7/3) (23° C., shear rate 92.5 s$^{-1}$) is 1.7 Pa·s.

The crosslinkable hyperbranched polyester macromolecule A9 was prepared according to a similar procedure using the components presented in Table 1e, in which in the second step of the reaction the hyperbranched intermediate, obtained from the reaction of Boltorn H20 polyol, 4-sodiosulfobenzoic acid (SSBA), lauric acid and the MPEG750/SAN adduct, was further reacted with 3-isocyanato-propyl triethoxy silane (Silquest A1310). This post-modification reaction was performed by mixing the OH-functional hyperbranched polyester and Silquest A1310 at room temperature, followed by addition of a catalytic amount of dibutyltin dilaurate (DBTDL) and subsequent heating of the reaction mixture to 90° C. until all the isocyanate had reacted, as judged from the Infra Red spectrum of the reaction mixture (the NCO groups typically show an absorption at 2275 cm$^{-1}$). NMP was used as co-solvent in this reaction. GPC analysis: Mw=55413; PDi=14.57. The viscosity of an 80% solids solution in NMP (50° C., shear rate 92.5 s$^{-1}$) is 4.9 Pa·s. The viscosity of a 70% solids solution in NMP/H$_2$O/DMEA (20/7/3) (23° C., shear rate 92.5 s$^{-1}$) is 8.3 Pa·s. All was prepared using a similar procedure as A8 using the components listed in Table 1d.

TABLE 1d

| Components (g) | A7 | A8 | A9 | A10 | A11 |
|---|---|---|---|---|---|
| Boltorn H20 polyol | — | 182.28 | 55.39 | — | 362.61 |
| Trimethylol propane | 78.24 | — | — | — | — |
| Pentaerythritol | 130.41 | — | — | 192.17 | — |
| SSBA | — | — | 7.05 | — | — |
| NourAcid LE80 | — | 345.96 | — | — | — |
| Prifac 8961 | 391.22 | — | — | 731.9 | 634.44 |
| Lauric acid | — | — | 53.41 | — | — |
| Adipic acid | 156.49 | — | — | 162.65 | — |
| MPEG750/SAN | — | 351.33 | 38.02 | — | — |
| NMP | — | — | 12.30 | — | — |
| SnCl2.H2O (catalyst) | 0.26 | 0.25 | 0.00 | 0.50 | — |
| Total reaction mixture | 756.62 | 879.82 | 166.17 | 1086.72 | 997.05 |
| Reaction water (theoretical) | 61.70 | 27.03 | 6.17 | 86.71 | 40.73 |
| Subtotal reaction mixture | 694.92 | 852.79 | 160.00 | 1000.51 | 956.32 |
| Acid value (mg KOH/g) | 6.5 | 7.3 | 6.2 | 0.8 | 6.2 |
| Silquest A1310 | — | — | 16.00 | — | — |
| DBTDL | — | — | 0.02 | — | — |
| NMP | — | — | 30.00 | — | — |
| Succinic anhydride (SAN) | 78.24 | — | 0.00 | 43.26 | — |
| Final Acid value (mg KOH/g solids) | 54.0 | 7.3 | 5.1 | 14.8 | 6.2 |
| Mw | 39936 | 21399 | 55413 | 250818 | 9432 |
| PDi | 10.2 | 5.09 | 14.57 | 49.93 | 1.85 |

Preparation of the Crosslinkable Urethane Oligomer Dispersion DA1

A 1-L 3-necked round bottom flask, equipped with a stirrer and a thermometer, was loaded with a portion of 500.00 g of the crosslinkable urethane oligomer A1 and the reactor was purged with nitrogen. The content of the reactor was heated to 70° C. and while stirring, the oligomer was diluted with dipropylene glycol monomethyl ether (51.38 g), N,N-dimethylethanolamine (DMEA; 10.27 g), DAPRO 5005 (5.84 g) and water (155.43 g) to form a predispersion. The mixture was homogenised at 55 to 60° C. and a portion of 600.00 g of this predispersion was subsequently fed into hot water (752.88 g; 50° C.) in a separate reactor in a nitrogen atmosphere. After complete addition of the predispersion, the product dispersion DA1 was stirred for an additional 15 min at 50° C., subsequently cooled to ambient temperature, filtered and stored in a nitrogen atmosphere. The dispersion DA1 has a solids content of 25.00%.

The urethane oligomer dispersions DA2, DA3 and DA4 were prepared according to a similar procedure using the components presented in Table 2.

Preparation of the Crosslinkable Vinyl Oligomer Dispersion DA5

A 250 mL 3-necked round bottom flask, equipped with a stirrer and a thermometer, was loaded with a portion of 12.50 g of the crosslinkable vinyl oligomer A5 and the reactor was purged with nitrogen. Then NMP (2.50 g), DPM (1.56 g) and DAPRO 5005 (0.15 g) were added and the contents of the reactor were stirred for 15 minutes at 50° C. Then DMEA (3.00 g) was added and the mixture was stirred for an additional 15 minutes at 50° C. Finally, hot water (50° C.; 30.14 g) was slowly added to the oligomer solution while the temperature of the dispersion mixture was kept at 50° C. The final dispersion was homogenised for an additional 15 minutes, then cooled to ambient temperature, filtered and stored under nitrogen. The vinyl oligomer dispersion DA5 had a solids content of 25.08%.

The oligomer dispersions DA6 to DA11 were prepared according to a similar procedure using the components presented in Table 2 below:

17.75 g). Then the reaction mixture was diluted with n-butyl methacrylate (BMA; 196.02 g) and the mixture was homogenised for 15 minutes at 65° C. In a nitrogen atmosphere, a 2-L 3-necked round bottom flask, equipped with a stirrer and thermometer, was loaded with a water phase consisting of water (1045.77 g) and n-butyl methacrylate (BMA; 174.00 g). A portion of 625 g of the urethane prepolymer, which was kept at 60–65° C., was fed into the water phase over a period of 1 hour, keeping the temperature of the reactor contents below 30° C. After the prepolymer feed was complete, the mixture was stirred for an additional 5 minutes. Then the urethane dispersion was chain-extended by the addition of an aqueous 64.45% hydrazine hydrate solution ($N_2H_4 \cdot H_2O$; 11.43 g in 25.00 g $H_2O$) and the temperature was allowed to drift for 10 minutes. A reactor temperature of 36° C. was reached. Subsequently, a 5% aqueous initiator solution of t-butyl hydroperoxide (t-BHPO; 18.10 g) and a 1% aqueous solution of ferric ethylene diamine tetraacetic acid ($Fe^{III}$.EDTA; 4.63 g) were

TABLE 2

| Components | DA1 | DA2 | DA3 | DA4 | DA5 | DA6 | DA7 | DA8 | DA9 | DA10 | DA11 |
| --- | --- | --- | --- | --- | --- | --- | --- | --- | --- | --- | --- |
| Oligomer | A1 | A2 | A3 | A4 | A5 | A6 | A7 | A8 | A9 | A10 | A11 |
| Oligomer (g) | 500.0 | 600.0 | 1440.0 | 949.80 | 12.5 | 20 | 160.00 | 250.0 | 43.60 | 150.00 | 300.00 |
| NMP or BG*(g) | — | — | — | — | 2.50 | 4.00 | 40.00* | 62.50 | — | 37.50* | — |
| DPM (g) | 51.38 | 61.66 | 150.0 | 97.60 | 1.56 | 2.50 | 49.35 | 31.25 | — | — | — |
| DAPRO 5005 (g) | 5.84 | 7.00 | 16.80 | 11.08 | 0.15 | 0.23 | 2.40 | 6.25 | — | 1.50 | 6.00 |
| ATLAS (g) | — | — | — | — | — | — | G4809 8.00 | — | — | G5000 10.50 | G5000 16.50 |
| DMEA (g) | 10.27 | 12.36 | 31.88 | 25.51 | 3.00 | 3.00 | 17.13 | 0.97 | — | 3.53 | — |
| water (g) | 155.43 | 186.51 | 446.7 | 295.25 | — | — | — | — | — | — | — |
| predispersion used (g) | 600.0 | 600.0 | 915.0 | 1100.00 | — | — | — | — | — | — | — |
| water (g) | 752.9 | 629.9 | 1213.1 | 919.97 | 30.14 | 50.20 | 382.73 | 312.6 | 95.92 | 332.64 | 312.00 |
| solids (%) | 25.00 | 25.00 | 23.50 | 29.94 | 25.08 | 25.02 | 25.15 | 37.87 | 24.89 | 30.08 | 49.89 |
| pH | 6.9 | 6.1 | 7.7 | 7.7 | 10.2 | 10.4 | 8.5 | 5.5 | 7.5 | 8.2 | 8.2 |

Preparation of the Urethane Acrylate Hybrid Dispersed Polymer P1

In a nitrogen atmosphere, a 1-L 3-necked round bottom flask, equipped with a stirrer and a thermometer, was loaded with N-methyl pyrrolidone (NMP; 100.00 g), dimethylol propanoic acid (DMPA; 24.00 g), dicyclohexyl methane diisocyanate (Desmodur W, trademark from Bayer; 152.68 g) and Priplast 3192 (Trademark from Uniqema; 223.33 g). The reaction mixture was heated to 55° C. The first portion of catalyst (0.05 g tin octoate) was added and the temperature was raised to 90–95° C. The mixture was kept at this temperature for 1 hour. The second portion of catalyst (0.05 g tin octoate) was then added and the mixture was kept at 90° C. for an additional hour. The NCO-concentration of the mixture was found to be 4.83%. A portion of 490.05 g of this resulting NCO terminated urethane prepolymer was then cooled to 70° C., and neutralised with triethyl amine (TEA;

added to the reaction mixture. The radical polymerisation was started by the addition of a 1% aqueous isoascorbic acid solution (iAA; 45.24 g). The reaction mixture was allowed to drift to the peak temperature, 56° C. Then an additional amount of the aqueous iAA (45.24 g) was added. The reaction mixture was homogenised for 15 minutes, then cooled to room temperature, filtered and collected. The dispersion has a solids content of 35.2%, a pH of 7.9 and a viscosity of 280 mPa·s.

Preparation of Vinyl Polymer Latex P3

In a nitrogen atmosphere, a 2-L 3-necked round bottom reactor, equipped with stirrer, was loaded with water (652.57 g), ATPOL E5720/20 (4.99 g; Trademark from Uniqema) and Borax.10$H_2O$ (Trademark from Chemproha, 3.57 g). The stirrer was started and the mixture was heated to 80° C. and then a solution of ammonium persulfate (2.31 g) in water (20 g) was added. In a dropping funnel a pre-emulsion was prepared by stirring a mixture of water (221.47 g), ATPOL E5720/20 (94.85 g), Borax.10H$_2$O (1.07 g), ammonium persulfate (0.70 g), methyl methacrylate (534.18 g), n-butyl methacrylate (444.32 g) and acrylic acid (19.97 g). The pre-emulsion was fed into the reactor over a period of 90 minutes at 85° C. Then the mixture was kept at this temperature for another hour, then cooled to ambient temperature and its pH was adjusted to 7–7.5 with 25% aqueous ammonia. Then the product latex was filtered and collected. The solids content of this latex is 51.2%. The vinyl polymer latex, which is an acrylic polymer latex, has a particle size of 451 nm and a calculated Tg of 19.4° C. (using the Fox equation).

The polymer latexes P2 and P4 were prepared according to similar procedures using the components presented in Table 3a, except for the following parameters:

An emulsified monomer feed was used in the preparation of P2 and P4.

The polymerisation temperature in the preparation of P2 and P4 was 80° C.

TABLE 3a

| Components (g) | P2 | P3 | P4 |
|---|---|---|---|
| Reactor phase | | | |
| Water | 1001.24 | 652.57 | 990.94 |
| SLS 30% | — | — | 0.55 |
| NaHCO$_3$ | 4.46 | — | 4.44 |
| Borax.10H$_2$O | — | 3.57 | — |
| Atpol E5720/20 | — | 4.99 | — |
| Shot at 80° C. | | | |
| AP | 0.89 | 2.31 | 0.89 |
| Water | 5.00 | 16.00 | 5.00 |
| Monomer feed | | | |
| STY | — | — | 399.70 |
| MMA | 352.94 | 534.18 | 124.35 |
| BA | 521.85 | 444.32 | 133.24 |
| BMA | — | — | 204.29 |
| AA | 17.85 | 19.97 | 17.77 |
| Atpol E5720/20 | — | 94.85 | — |
| Borax.10H$_2$O | — | 1.07 | — |
| Aerosol OT-75 | — | 7.20 | — |
| Water | — | 161.87 | — |
| Separate feed | | | |
| Water | 50.00 | 7.88 | 50.00 |
| AP | 0.89 | 0.53 | 0.89 |
| SLS 30% | 14.88 | 0.00 | 29.06 |

Burn-up at 60° C. for P4: IAA (0.88), t-BHPO (0.88) water (14.67)

Preparation of a Dispersed Polymer P5

Dispersed polymer P5 was derived from a recipe described in the product brochure from Shell Chemicals, see bulletin VV 2.1.1 issued February 1999. In a nitrogen atmosphere, a 2-L 3-necked round bottom glass reactor, equipped with stirrer, thermometer and baffles, was loaded with demineralised water (194.50 g), Akyposal NAF (3.00 g; Trademark from KAO Chemicals), Borax.10H$_2$O (1.25 g), Acetic acid (0.50 g) and Natrosol 250LR (10.00 g; Trademark from Hercules). The mixture was heated to 60° C. while stirring and then a solution of AP (0.50 g) in demineralised water (10.00 g) was added. In a dropping funnel a pre-emulsion was prepared by stirring with demineralised water (171.71 g), Akyposal NAF (3.00), Borax.10H$_2$O (1.25 g), Acetic acid (0.50 g) and Atlas G-4809 (14.29 g) followed by VeoVa 10 (125.00 g; Trademark from Shell) and vinyl acetate (375.00 g). An amount of 10% of this mixture was added to the reactor at 60° C. The mixture was heated whilst stirring to 80° C. The remainder was fed into the reactor over a period of 90 minutes at 80° C. The content of a separate dropping funnel, containing a solution of AP (1.15 g) in demineralised water (60.00 g), was added in the same time. Then the reactor content was kept at this temperature for 120 minutes and then cooled to ambient temperature. The pH was adjusted to 8 to 8.5 with 12.5% aqueous ammonia. Then the product was filtered and collected. The properties of P1 to P5 are shown below in Table 3b.

TABLE 3b

| Dispersed polymer characterisation P1 to P5 | | | | | |
|---|---|---|---|---|---|
| Parameter | P1 | P2 | P3 | P4 | P5 |
| Solids (%) | 35.2 | 45.0 | 51.2 | 44.3 | 50.3 |
| pH | 7.9 | 8.2 | 8.3 | 8.2 | 8.2 |
| Particle size (nm) | 65 | 590 | 450 | 230 | 330 |
| Tg (° C.)* | 43 | 2 | 25 | 54 | 24 |
| Acid value (mgKOH/g)** | 12.4 | 15.6 | 15.6 | 15.6 | 0 |

*Measured Tg with DSC (midpoint)
**Theoretical Acid value on solids

Preparation of the Oligomer/Dispersed Polymer Blend A1P1

In a nitrogen atmosphere, a 1-L 3-necked round bottom flask, equipped with a stirrer, was loaded with water (15.41 g), dispersion DA1 (225.00 g) and the vinyl polymer latex PA1 (154.65 g). The mixture was stirred for 30 minutes at ambient temperature, and subsequently filtered and then stored under nitrogen. The resultant dispersion A1P1 had a pH of 7.2, a Brookfield viscosity of 92 mPa·s and a solids content of 27.58% by weight.

Further oligomer/polymer blend dispersions were prepared according to similar procedures using the components shown below in Table 4.

TABLE 4

| Components | A1P1 | A2P2 | A3P3 | A4A5A6P4 | A7P5 | A4A8A9P4 | A11P4 |
|---|---|---|---|---|---|---|---|
| Oligomer | DA1 | DA2 | DA3 | DA5/DA6/DA4 | DA7 | DA8/DA9/DA4 | DA11 |
| Oligomer (g) | 225.00 | 90.00 | 170.89 | 16.0/8.0/30.0 | 78.43 | 8.70/6.56/24.73 | 450.00 |
| Oligomer (wt %) | 50 | 15 | 50 | 16/8/36 | 50 | 8.8/4.4/20 | 50 |
| Total oligomer (wt %) | 50 | 15 | 50 | 60 | 50 | 33.3 | 50 |

TABLE 4-continued

| Components | A1P1 | A2P2 | A3P3 | A4A5A6P4 | A7P5 | A4A8A9P4 | A11P4 |
|---|---|---|---|---|---|---|---|
| Polymer | P1 | P2 | P3 | P4 | P5 | P4 | P4 |
| Polymer (g) | 154.65 | 295.20 | 78.44 | 22.57 | 39.20 | 55.34 | 507.9 |
| Polymer (wt %) | 50 | 85 | 50 | 40 | 50 | 66.7 | 50 |
| Water (g) | 15.41 | 28.88 | — | 23.43 | 17.9 | 8.44 | 167.67 |
| Total solids (%) | 27.58 | 37.77 | 32.21 | 25.0 | 29.1 | 38.91 | 39.37 |
| pH | 7.2 | 7.8 | 7.4 | 10.2 | 8.5 | 7.8 | 7.2 |

EXAMPLE 1

Pigmented Paint Composition Comprising Dispersion A1P1.

A 1-L 3-necked round bottom flask, equipped with a stirrer, was loaded with dispersion A1P1 (312.18 g) and a $TiO_2$-based pigment paste (106.00 g; solids content of 74.9%) in a nitrogen atmosphere, and the mixture was stirred for 30 minutes at ambient temperature. The resulting paint had a solids content of 40.76%. Example 1 was formulated with 0.4% Byk 344 on binder solids (in all other cases 0.2% was used).

Examples 2, 4, 5, 7, 8 and 9, and comparative examples C3 and C6 were prepared according to similar procedures using the components presented in Table 5.

All paint examples were further formulated with a wetting agent (Byk 344, trademark from Byk-Chemie; 0.2% on binder solids) and a urethane thickener (Borichigel L75N, Trademark from Borchers GmbH) was added until a suitable paint viscosity was obtained (4,000 to 6,000 mPa·s). The resulting paint formulations were left undisturbed for 24 hours, then stirred up to mix the contents intimately, checked (and when necessary corrected) for their viscosity, and finally tested on drying and other properties. The drying and other properties of these examples are also presented in Table 5 below.

Example C3 is comparative in that it does not contain a crosslinkable oligomer and the wet edge time observed for this paint is below 10 minutes. The difference between example C3 and the working examples is also reflected in its drying profile determined with the Thin Film Analyser (TFA), in which the force caused by the drying paint film increases significantly more than the limit of 12,000 mg within the first 26 minutes of drying process. Alternatively, the maximum value for the average force for at least one series of successive scratches ($\geq 8$ scratches) measured during an eight minute interval measured between 21 and 60 minutes after application is not more then 2000 higher then each series of successive scratches ($\geq 8$ scratches) measured during an eight minute interval in the first 20 minutes after application of the coating.

Example C6 is comparative in that the L-value of A3 is $>40 \times 10^4$; which means that A3 is not an oligomer as defined herein, additionally the wet edge time observed for this paint is below 10 minutes. The difference between example C6 and the working examples is also reflected in its drying profile determined with the Thin Film Analyser (TFA), in which the force caused by the drying paint film increases significantly more than the limit of 12,000 mg within the first 26 minutes of drying process.

TABLE 5

| Example | 1 | 2 | C3 | 4 | 5 | C6 | 7 | 8 | 9 |
|---|---|---|---|---|---|---|---|---|---|
| Blend | A1P1 | A2P2 | P5 | A4A5A6P4 | A7P5 | A3P3 | A4A8A9P4 | DA10 | A11P4 |
| Blend (g) | 312.18 | 268.74 | 100.00 | 100.00 | 135.53 | 179.14 | 71.12 | 70.00 | 70.00 |
| Pigment C830 (g) | 106.00 | 124.83 | 61.92 | 30.78 | 48.50 | 70.77 | 50.30 | 30.16 | — |
| Solids (%) | 40.76 | 52.03 | 59.71 | 36.74 | 43.80 | 40.79 | 56.51 | 43.58 | 39.37 |
| Open Time (minutes) | 60 | 44 | 12 | 60 | 45 | 47 | 38 | 57 | 65 |
| Wet edge time (minutes) | 24 | 20 | 4 | 24 | 18 | 8 | 16 | 19 | 23 |
| Dust-free time (minutes) | 75 | 60 | 10 | 45 | 35 | 30 | 70 | 20 | 20 |
| Tack-free time (hours) | 15 | 19 | 0.5 | 5 | 2 | 4.5 | 1.2 | 6 | 3 |
| Thumb-hard time (hours) | 20 | 23 | 0.5 | 8 | 9 | 9 | 1.2 | 6.5 | 6.5 |
| Yellowness at start | 3.75 | 3.09 | — | 2.82 | 3.02 | 4.83 | 3.09 | — | — |
| Yellowing (Δb dark) | 2.42 | 1.79 | — | 1.82 | 3.46 | 3.11 | 1.37 | — | — |
| Yellowing (Δb day) | 1.1 | 1.28 | — | 0.96 | 1.02 | 1.3 | 0.29 | — | — |

The drying profile of all examples prepared above were measured with the Thin Film Analyser (TFA). The results are shown in Tables 6a to 6i and are summarised in Table 6j below. Table 6h illustrates that when a composition does not contain an oligomer with a Mw <100,000, see comparative examples C3 and C6), the time period, in which the force experienced by the TFA probe is <12,000, is shorter than 26 minutes.

TABLE 6a

Example 1 (A1P1)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:01:29 | 10237 | 00:04:30 | 11034 | 00:06:11 | 10968 |
| 00:03:11 | 10887 | 00:05:54 | 11076 | 00:07:24 | 11051 |
| 00:04:45 | 11247 | 00:07:04 | 11162 | 00:08:37 | 11167 |
| 00:05:42 | 11023 | 00:08:01 | 11075 | 00:09:51 | 11231 |
| 00:07:24 | 11776 | 00:09:07 | 11150 | 00:11:11 | 11323 |
| 00:08:28 | 10449 | 00:10:14 | 11058 | 00:12:31 | 11310 |
| 00:08:59 | 11312 | 00:11:28 | 11320 | 00:13:56 | 11468 |
| 00:09:32 | 10813 | 00:12:56 | 11409 | 00:15:29 | 11529 |
| 00:11:14 | 10897 | 00:14:38 | 11581 | 00:17:11 | 11594 |
| 00:12:55 | 11820 | 00:16:20 | 11744 | 00:18:53 | 11702 |
| 00:14:38 | 11757 | 00:18:02 | 11740 | 00:20:36 | 11686 |
| 00:16:20 | 11757 | 00:19:45 | 11656 | 00:22:18 | 11636 |
| 00:18:03 | 11673 | 00:21:27 | 11656 | 00:23:49 | 11571 |
| 00:19:45 | 11715 | 00:23:09 | 11660 | 00:25:10 | 11592 |
| 00:21:26 | 11799 | 00:24:51 | 11589 | 00:26:34 | 11648 |
| 00:23:09 | 11337 | 00:26:16 | 11477 | 00:28:02 | 11716 |
| 00:24:51 | 11757 | 00:27:24 | 11578 | 00:29:25 | 11938 |
| 00:26:33 | 11694 | 00:28:37 | 11657 | 00:30:41 | 12208 |
| 00:28:15 | 11358 | 00:29:56 | 11787 | 00:31:58 | 12420 |
| 00:28:31 | 11239 | 00:31:08 | 12140 | 00:33:17 | 12771 |
| 00:28:48 | 11841 | 00:32:26 | 12674 | 00:34:42 | 13206 |
| 00:30:58 | 12155 | 00:34:02 | 12984 | 00:36:15 | 13455 |
| 00:33:08 | 12344 | 00:35:36 | 13387 | 00:37:37 | 13636 |
| 00:34:16 | 13120 | 00:36:56 | 13861 | 00:38:57 | 13842 |
| 00:35:02 | 13910 | 00:38:20 | 14003 | 00:40:17 | 13913 |
| 00:36:48 | 13392 | 00:39:43 | 13942 | 00:41:40 | 13979 |
| 00:38:46 | 14168 | 00:41:06 | 14062 | 00:43:09 | 14003 |
| 00:39:50 | 14714 | 00:42:20 | 13966 | 00:44:41 | 14000 |
| 00:41:13 | 13833 | 00:43:35 | 13911 | | |
| 00:41:57 | 13604 | 00:45:05 | 13862 | | |
| 00:43:42 | 13994 | 00:46:53 | 13970 | | |
| 00:44:57 | 13686 | | | | |
| 00:46:06 | 14441 | | | | |

TABLE 6b

Example 2 (A2P2)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 11233 | 00:03:27 | 11061 | 00:06:47 | 11096 |
| 00:01:21 | 11253 | 00:05:27 | 11031 | 00:08:55 | 11117 |
| 00:02:57 | 10897 | 00:07:39 | 10993 | 00:11:11 | 11125 |
| 00:05:18 | 10708 | 00:10:00 | 11077 | 00:13:32 | 11177 |
| 00:07:39 | 11212 | 00:12:21 | 11216 | 00:15:53 | 11259 |
| 00:10:00 | 11086 | 00:14:42 | 11237 | 00:18:13 | 11280 |
| 00:12:21 | 11065 | 00:17:04 | 11283 | 00:20:25 | 11322 |
| 00:14:42 | 11316 | 00:19:25 | 11342 | 00:22:23 | 11379 |
| 00:17:04 | 11400 | 00:21:45 | 11354 | 00:24:11 | 11445 |
| 00:19:25 | 11316 | 00:23:51 | 11358 | 00:25:46 | 11576 |
| 00:21:46 | 11316 | 00:25:35 | 11400 | 00:27:11 | 11817 |
| 00:24:08 | 11358 | 00:27:02 | 11505 | 00:28:24 | 12124 |
| 00:26:22 | 11379 | 00:28:10 | 11723 | 00:29:26 | 12436 |
| 00:27:33 | 11421 | 00:29:02 | 12096 | 00:30:18 | 12816 |
| 00:28:08 | 11526 | 00:29:50 | 12566 | 00:31:07 | 13240 |
| 00:28:59 | 11841 | 00:30:42 | 13032 | 00:31:59 | 13644 |
| 00:29:50 | 12449 | 00:31:33 | 13548 | 00:32:50 | 14032 |
| 00:30:41 | 13246 | 00:32:24 | 14022 | 00:33:41 | 14360 |
| 00:31:33 | 13770 | 00:33:16 | 14324 | 00:34:32 | 14548 |
| 00:32:25 | 13854 | 00:34:07 | 14558 | 00:35:23 | 14624 |
| 00:33:16 | 14420 | 00:34:58 | 14802 | 00:36:15 | 14708 |
| 00:34:07 | 14818 | 00:35:49 | 14869 | 00:37:06 | 14611 |
| 00:34:58 | 14755 | 00:36:40 | 14781 | | |
| 00:35:49 | 14944 | 00:37:31 | 14735 | | |
| 00:36:40 | 15070 | 00:38:22 | 14474 | | |

TABLE 6c

Example C3 (P5)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 11274 | 00:01:48 | 11254 | 00:03:23 | 11236 |
| 00:01:00 | 11551 | 00:02:47 | 11216 | 00:04:26 | 11278 |
| 00:01:35 | 11002 | 00:03:47 | 11123 | 00:05:29 | 11419 |
| 00:02:38 | 11337 | 00:04:54 | 11212 | 00:06:37 | 11783 |
| 00:03:46 | 11107 | 00:06:03 | 11266 | 00:07:45 | 12024 |
| 00:04:54 | 11086 | 00:07:11 | 11581 | 00:08:53 | 12273 |
| 00:06:03 | 11086 | 00:08:20 | 12147 | 00:10:02 | 12696 |
| 00:07:11 | 11442 | 00:09:28 | 12583 | 00:11:10 | 13119 |
| 00:08:20 | 11610 | 00:10:36 | 12914 | 00:12:18 | 13596 |
| 00:09:28 | 12679 | 00:11:44 | 13486 | 00:13:26 | 14037 |
| 00:10:36 | 13917 | 00:12:52 | 13844 | 00:14:34 | 14422 |
| 00:11:44 | 13267 | 00:14:00 | 14113 | 00:15:42 | 14571 |
| 00:12:52 | 13099 | 00:15:08 | 14487 | 00:16:46 | 14899 |
| 00:14:00 | 14470 | 00:16:16 | 15018 | 00:17:50 | 15224 |
| 00:15:08 | 14470 | 00:17:25 | 15147 | 00:18:54 | 15239 |
| 00:16:16 | 15260 | 00:18:26 | 15430 | 00:19:57 | 15148 |
| 00:17:25 | 15134 | 00:19:27 | 15518 | 00:21:01 | 14969 |
| 00:18:33 | 15757 | 00:20:28 | 15410 | 00:22:05 | 14787 |
| 00:19:41 | 15113 | 00:21:29 | 15007 | 00:23:08 | 14527 |
| 00:20:14 | 15888 | 00:22:30 | 14749 | 00:24:12 | 14371 |

TABLE 6d

Example 4 (A4A5A6P4)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 10792 | 00:01:19 | 10367 | 00:03:39 | 10307 |
| 00:00:16 | 10561 | 00:02:27 | 10256 | 00:05:03 | 10349 |
| 00:00:33 | 10373 | 00:03:54 | 10074 | 00:06:39 | 10246 |
| 00:01:59 | 10499 | 00:05:40 | 10145 | 00:08:27 | 10217 |
| 00:03:49 | 9611 | 00:07:31 | 10271 | 00:10:18 | 10325 |
| 00:05:40 | 10234 | 00:09:22 | 10298 | 00:12:09 | 10302 |
| 00:07:31 | 9653 | 00:11:14 | 10279 | 00:14:01 | 10199 |
| 00:09:22 | 10729 | 00:13:05 | 10620 | 00:15:52 | 10252 |
| 00:11:14 | 11128 | 00:14:56 | 10360 | 00:17:44 | 10150 |
| 00:13:05 | 9744 | 00:16:48 | 10016 | 00:19:35 | 10029 |
| 00:14:56 | 10142 | 00:18:39 | 10083 | 00:21:26 | 10398 |
| 00:16:48 | 11358 | 00:20:31 | 10037 | 00:23:17 | 10768 |
| 00:18:39 | 9429 | 00:22:22 | 9797 | 00:25:08 | 10985 |
| 00:20:31 | 9408 | 00:24:13 | 10451 | 00:27:00 | 11468 |
| 00:22:22 | 10079 | 00:26:04 | 11189 | 00:28:51 | 11937 |
| 00:24:13 | 9911 | 00:27:55 | 11793 | 00:30:42 | 12327 |
| 00:26:04 | 10157 | 00:29:46 | 12469 | 00:32:34 | 12749 |
| 00:27:55 | 12700 | 00:31:38 | 13069 | 00:34:17 | 13115 |
| 00:29:46 | 13099 | 00:33:29 | 13170 | 00:35:50 | 13125 |
| 00:31:37 | 13099 | 00:35:21 | 13208 | 00:37:13 | 13075 |
| 00:33:30 | 13288 | 00:36:59 | 13204 | 00:38:25 | 13033 |
| 00:35:21 | 13162 | 00:38:21 | 13103 | 00:39:27 | 12996 |
| 00:37:12 | 13204 | 00:39:27 | 13011 | 00:40:19 | 12937 |
| 00:39:03 | 13288 | 00:40:16 | 12921 | | |
| 00:39:51 | 13078 | 00:40:49 | 12863 | | |
| 00:40:20 | 12784 | 00:41:18 | 12786 | | |

TABLE 6e

Example 5 (A7P5)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 11128 | 00:03:42 | 10826 | 00:06:29 | 10666 |
| 00:01:51 | 10813 | 00:05:33 | 10692 | 00:08:20 | 10737 |

TABLE 6e-continued

Example 5 (A7P5)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:03:42 | 10834 | 00:07:24 | 10595 | 00:10:11 | 10645 |
| 00:05:33 | 10813 | 00:09:15 | 10511 | 00:12:02 | 10640 |
| 00:07:24 | 10541 | 00:11:06 | 10687 | 00:13:53 | 10575 |
| 00:09:15 | 10457 | 00:12:57 | 10595 | 00:15:44 | 10574 |
| 00:11:06 | 10331 | 00:14:48 | 10662 | 00:17:35 | 10550 |
| 00:12:57 | 10415 | 00:16:40 | 10654 | 00:19:26 | 10663 |
| 00:14:48 | 11694 | 00:18:31 | 10678 | 00:21:17 | 10820 |
| 00:16:40 | 10079 | 00:20:22 | 10393 | 00:23:08 | 10826 |
| 00:18:31 | 10793 | 00:22:13 | 10623 | 00:24:53 | 11033 |
| 00:20:22 | 10289 | 00:24:04 | 10799 | 00:26:28 | 11185 |
| 00:22:13 | 10534 | 00:25:55 | 11089 | 00:27:55 | 11394 |
| 00:24:03 | 10268 | 00:27:35 | 11329 | 00:29:13 | 11560 |
| 00:25:55 | 11233 | 00:29:01 | 11677 | 00:30:22 | 11775 |
| 00:27:46 | 11673 | 00:30:14 | 11824 | 00:31:22 | 12098 |
| 00:29:37 | 11736 | 00:31:12 | 11862 | 00:32:13 | 12331 |
| 00:30:34 | 11736 | 00:31:56 | 11912 | 00:32:55 | 12567 |
| 00:31:15 | 12008 | 00:32:36 | 12327 | 00:33:34 | 12797 |
| 00:31:56 | 11966 | 00:33:15 | 12633 | 00:34:12 | 13018 |
| 00:32:37 | 11862 | 00:33:55 | 12965 | 00:34:48 | 13225 |
| 00:33:19 | 11987 | 00:34:32 | 13309 | 00:35:23 | 13432 |
| 00:33:51 | 13812 | 00:35:08 | 13665 | | |

TABLE 6f

Example C6 (A3P3)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 11768 | 00:00:50 | 11462 | 00:02:38 | 11586 |
| 00:00:16 | 11063 | 00:01:36 | 11464 | 00:03:46 | 11600 |
| 00:00:33 | 11091 | 00:02:41 | 11620 | 00:05:05 | 11682 |
| 00:01:16 | 11548 | 00:04:02 | 11753 | 00:06:36 | 11770 |
| 00:02:06 | 11841 | 00:05:37 | 11820 | 00:08:14 | 11830 |
| 00:03:51 | 11778 | 00:07:22 | 11795 | 00:09:59 | 11864 |
| 00:05:37 | 11841 | 00:09:07 | 11799 | 00:11:44 | 11927 |
| 00:07:22 | 11757 | 00:10:52 | 11836 | 00:13:29 | 11995 |
| 00:09:07 | 11883 | 00:12:36 | 11908 | 00:15:14 | 12077 |
| 00:10:51 | 11715 | 00:14:21 | 11987 | 00:16:59 | 12147 |
| 00:12:37 | 11799 | 00:16:06 | 12122 | 00:18:44 | 12241 |
| 00:14:21 | 12029 | 00:17:51 | 12243 | 00:20:29 | 12326 |
| 00:16:06 | 12113 | 00:19:36 | 12327 | 00:22:14 | 12395 |
| 00:17:51 | 12281 | 00:21:21 | 12397 | 00:23:59 | 12492 |
| 00:19:36 | 12386 | 00:23:07 | 12437 | 00:25:45 | 12607 |
| 00:21:21 | 12407 | 00:24:52 | 12475 | 00:27:30 | 12720 |
| 00:23:07 | 12449 | 00:26:37 | 12572 | 00:29:15 | 12879 |
| 00:24:52 | 12465 | 00:28:23 | 12723 | 00:31:01 | 13050 |
| 00:26:37 | 12481 | 00:30:08 | 12887 | 00:32:46 | 13200 |
| 00:28:22 | 12575 | 00:31:53 | 13128 | 00:34:31 | 13288 |
| 00:30:08 | 12889 | 00:33:39 | 13376 | 00:36:16 | 13432 |

TABLE 6g

Example 7 (A4A8A9P4)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 10526 | 00:03:42 | 9380 | 00:06:28 | 9357 |
| 00:01:51 | 8989 | 00:05:32 | 9119 | 00:08:19 | 9227 |
| 00:03:42 | 9052 | 00:07:23 | 9177 | 00:10:10 | 9277 |
| 00:05:32 | 9052 | 00:09:14 | 9257 | 00:12:01 | 9314 |
| 00:07:23 | 9282 | 00:11:05 | 9345 | 00:13:52 | 9353 |

TABLE 6g-continued

Example 7 (A4A8A9P4)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:09:14 | 9219 | 00:12:57 | 9366 | 00:15:44 | 9379 |
| 00:11:05 | 9282 | 00:14:48 | 9391 | 00:17:35 | 9403 |
| 00:12:57 | 9450 | 00:16:39 | 9408 | 00:19:26 | 9458 |
| 00:14:48 | 9492 | 00:18:30 | 9417 | 00:21:17 | 9510 |
| 00:16:39 | 9387 | 00:20:22 | 9400 | 00:23:08 | 9634 |
| 00:18:30 | 9345 | 00:22:13 | 9467 | 00:24:59 | 9927 |
| 00:20:22 | 9366 | 00:24:04 | 9572 | 00:26:42 | 10271 |
| 00:22:13 | 9492 | 00:25:55 | 9794 | 00:28:14 | 10732 |
| 00:24:04 | 9408 | 00:27:46 | 10243 | 00:29:37 | 11091 |
| 00:25:55 | 9723 | 00:29:23 | 10780 | 00:30:49 | 11474 |
| 00:27:46 | 9869 | 00:30:45 | 11446 | 00:31:52 | 11803 |
| 00:29:37 | 10478 | 00:31:50 | 11946 | 00:32:45 | 12096 |
| 00:31:28 | 11736 | 00:32:39 | 12344 | 00:33:27 | 12360 |
| 00:32:10 | 12092 | 00:33:13 | 12468 | 00:34:00 | 12330 |
| 00:32:42 | 13057 | 00:33:44 | 12492 | 00:34:31 | 12307 |
| 00:33:13 | 12365 | 00:34:16 | 12399 | 00:35:03 | 12220 |
| 00:33:44 | 12470 | 00:34:47 | 12225 | 00:35:34 | 12206 |
| 00:34:16 | 12358 | 00:35:18 | 12112 | 00:36:06 | 12148 |
| 00:34:47 | 12212 | 00:35:50 | 12114 | 00:36:37 | 12048 |
| 00:35:18 | 12589 | 00:36:21 | 12122 | 00:37:08 | 12024 |
| 00:35:50 | 11499 | 00:36:53 | 12004 | 00:37:40 | 11976 |
| 00:36:21 | 11904 | 00:37:24 | 12017 | | |
| 00:36:53 | 12365 | 00:37:55 | 12040 | | |
| 00:37:24 | 12253 | 00:38:27 | 12008 | | |
| 00:37:55 | 12002 | | | | |
| 00:38:27 | 11561 | | | | |
| 00:38:58 | 12016 | | | | |

TABLE 6h

Example 8 (A10)

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 0:00:00 | 5067 | 00:03:26 | 4856 | 00:06:08 | 4820 |
| 0:01:55 | 4816 | 00:05:11 | 4793 | 00:07:58 | 4783 |
| 0:03:14 | 4861 | 00:06:56 | 4789 | 00:09:39 | 4793 |
| 0:05:05 | 4585 | 00:08:47 | 4763 | 00:11:26 | 4885 |
| 0:06:56 | 4951 | 00:10:41 | 4800 | 00:13:17 | 5013 |
| 0:08:47 | 4753 | 00:12:23 | 4790 | 00:15:10 | 5083 |
| 0:10:37 | 4795 | 00:14:09 | 4958 | 00:17:05 | 5183 |
| 0:12:28 | 4731 | 00:15:59 | 5121 | 00:19:03 | 5416 |
| 0:14:38 | 4771 | 00:17:53 | 5277 | 00:21:03 | 5702 |
| 0:15:25 | 4901 | 00:19:48 | 5433 | 00:23:03 | 6200 |
| 0:17:36 | 5592 | 00:21:58 | 5785 | 00:25:14 | 7049 |
| 0:19:48 | 5613 | 00:24:09 | 6070 | 00:27:25 | 7951 |
| 0:21:59 | 5508 | 00:26:19 | 6699 | 00:29:32 | 8968 |
| 0:24:10 | 5551 | 00:28:30 | 7936 | 00:31:26 | 9995 |
| 0:26:19 | 6661 | 00:30:40 | 9387 | 00:33:06 | 11025 |
| 0:28:29 | 7018 | 00:32:46 | 10805 | 00:34:32 | 11898 |
| 0:30:40 | 8758 | 00:34:30 | 12147 | 00:35:47 | 12721 |
| 0:32:50 | 11694 | 00:35:52 | 13153 | 00:36:48 | 13267 |
| 0:36:50 | 13749 | 00:37:33 | 13703 | 00:38:08 | 13526 |
| 0:37:09 | 13728 | 00:37:57 | 13577 | 00:38:30 | 13442 |
| 0:37:27 | 13791 | 00:38:20 | 13493 | 00:38:52 | 13277 |
| 0:37:48 | 13644 | 00:38:44 | 13388 | 00:39:04 | 13204 |
| 0:38:30 | 13602 | 00:39:07 | 13275 | 00:39:16 | 13130 |
| 0:38:50 | 13120 | 00:39:25 | 13036 | 00:39:25 | 13036 |
| 0:39:07 | 13309 | 00:39:34 | 13015 | 00:39:34 | 13015 |
| 0:39:24 | 13267 | 00:39:43 | 12917 | 00:39:43 | 12917 |
| 0:39:42 | 13078 | 00:39:53 | 12742 | 00:39:53 | 12742 |
| 0:40:04 | 12407 | 00:40:04 | 12407 | | |

TABLE 6i

Example 9

| Time (h:min:sec) | Force (mg) | Average Time (h:min:sec) over 5 measurements | Average force (mg) over 5 measurements | Average Time (h:min:sec) over 8 measurements | Average force (mg) over 8 measurements |
|---|---|---|---|---|---|
| 00:00:00 | 6556 | 00:01:57 | 7504 | 00:04:10 | 8336 |
| 00:01:31 | 5214 | 00:03:05 | 8427 | 00:05:34 | 8690 |
| 00:01:48 | 7311 | 00:04:21 | 9085 | 00:07:03 | 9274 |
| 00:02:08 | 9828 | 00:06:00 | 9521 | 00:08:47 | 9699 |
| 00:04:19 | 8611 | 00:07:49 | 9433 | 00:10:44 | 9822 |
| 00:05:40 | 11170 | 00:09:39 | 9689 | 00:12:41 | 10184 |
| 00:07:51 | 8506 | 00:11:38 | 9597 | 00:14:45 | 10446 |
| 00:10:02 | 9492 | 00:13:37 | 10058 | 00:16:48 | 11222 |
| 00:11:15 | 9387 | 00:15:36 | 10461 | 00:18:52 | 11995 |
| 00:13:25 | 9890 | 00:17:46 | 11237 | 00:21:03 | 12871 |
| 00:15:36 | 10708 | 00:19:57 | 12201 | 00:23:14 | 13628 |
| 00:17:46 | 10813 | 00:22:08 | 13195 | 00:25:24 | 14378 |
| 00:19:57 | 11505 | 00:24:19 | 14311 | 00:27:25 | 15136 |
| 00:22:08 | 13267 | 00:26:30 | 15200 | 00:29:12 | 15825 |
| 00:24:19 | 14714 | 00:28:41 | 15888 | 00:30:46 | 16236 |
| 00:26:30 | 15678 | 00:30:35 | 16320 | 00:32:07 | 16512 |
| 00:28:40 | 16391 | 00:32:07 | 16588 | 00:33:13 | 16638 |
| 00:30:52 | 15951 | 00:33:20 | 16622 | 00:34:07 | 16698 |
| 00:33:02 | 16706 | 00:34:10 | 16815 | 00:34:46 | 16803 |

TABLE 6j

| Example | 1 | 2 | C3 | 4 | 5 | C6 | 7 | 8 | 9 |
|---|---|---|---|---|---|---|---|---|---|
| Binder code | A1P1 | A2P2 | P5 | A4A5A6P4 | A7P5 | A3P3 | A4A8A9P4 | DA10 | A11P4 |
| Drying Time (min) during which the Custom Force < 12,000 mg | 29 | 29 | 9 | 27 | 32 | 14 | 32 | 33 | 20 |
| Drying Time (min) during which the Force over 5 measurements < 12,000 mg | 30 | 28 | 8 | 28 | 32 | 14 | 32 | 33 | 18 |
| Drying Time (min) during which the Force over 8 measurements < 12,000 mg | 29 | 27 | 8 | 29 | 31 | 13.5 | 32 | 34 | 19 |

The L values for the examples were calculated as defined herein and shown below in Table 7. An example illustrating how to carry out the calculation is given below for Example 1 in Tables 8, 9 and 10. The values given for Mw and PDi may be different in Table 7 than in the Tables above because the species with Mw <1000 g/mole are not included, whereas in the Tables above for the Mw and PDi listed all species were included.

TABLE 7

| Example | 1 | 1 | 1 | 2 | 2 | 2 | C3 | C3 |
|---|---|---|---|---|---|---|---|---|
| Code | A1 | BT24 | P1 | A2 | BT24 | P2 | P5 | BT24 |
| FA | 47.6 | 0 | 0 | 58.2 | 0 | 0.0 | 0 | 0 |
| NI | 4.63 | 0 | 0 | 4.63 | 0 | 0.0 | 0 | 0 |
| Rings | 156.1 | 0 | 144.5 | 105 | 0 | 0.0 | 0 | 0 |
| Acid | 35.4 | 131.5 | 22.2 | 35.4 | 131.5 | 17.8 | 0 | 131.5 |
| OH | 127.5 | 0 | 0 | 270 | 0 | 0.0 | 0 | 0 |
| Urethane | 281.6 | 0 | 144.5 | 180 | 0 | 0.0 | 0 | 0 |
| Methyl | 0.0 | 7.757 | 10.6 | 0 | 7.757 | 5.93 | 0 | 7.757 |
| Styrene | 0.0 | 0 | 0 | 0 | 0 | 0.0 | 0 | 0 |
| Amide | 94.5 | 0 | 0 | 102.7 | 0 | 0.0 | 0 | 0 |
| Mw | 4344 | 30000 | 387200 | 2088 | 30000 | 591000 | 158881 | 30000 |
| PDi | 1.6 | 2.7 | 6.7 | 1.3 | 2.7 | 7.7 | 16.62 | 2.7 |
| Q | 9.6 | 8.8 | 5 | 8.5 | 8.8 | 1.85 | 0 | 8.8 |
| A | 10 | 10 | 0.45 | 16.3 | 16.3 | 0.45 | 0.45 | 31.9 |
| Y | $8.60 \times 10^3$ | 0.0 | 0.0 | $8.60 \times 10^3$ | 0.0 | 0 | 0 | 0 |
| Z | $9.52 \times 10^4$ | 0.0 | 0.0 | $1.16 \times 10^5$ | 0.0 | 0.0 | 0 | 0 |
| V | 0.0 | $4.05 \times 10^3$ | $1.60 \times 10^4$ | 0.0 | $4.05 \times 10^3$ | $3.28 \times 10^3$ | $7 \times 10^2$ | $4.05 \times 10^3$ |
| L value | $-10 \times 10^4$ | $35 \times 10^4$ | $4 \times 10^7$ | $-12 \times 10^4$ | $27 \times 10^4$ | $2 \times 10^7$ | $5 \times 10^6$ | $19 \times 10^4$ |

TABLE 7-continued

| Example | 4 | 4 | 4 | 4 | 4 | 5 | 5 | 5 |
|---|---|---|---|---|---|---|---|---|
| Code | A4 | A5 | A6 | BT24 | P4 | A7 | BT24 | P5 |
| FA | 0 | 35.3 | 0 | 0 | 0 | 46.7 | 0 | 0 |
| NI | 2 | 10.5 | 12.6 | 0 | 0 | 0 | 0 | 0 |
| Rings | 164.2 | 0 | 0 | 0 | 438.7 | 0 | 0 | 0 |
| Acid | 38.1 | 0 | 0 | 131.5 | 28.2 | 96.3 | 131.5 | 0 |
| OH | 47.8 | 132 | 0 | 0 | 0 | 156.9 | 0 | 0 |
| Urethane | 328.5 | 0 | 0 | 0 | 0 | 0 | 0 | 0 |
| Methyl | 0 | 9.57 | 9.368 | 7.757 | 4.592 | 0 | 7.757 | 0 |
| Styrene | 0 | 0 | 0 | 0 | 45.6 | 0 | 0 | 0 |
| Amide | 0 | 0 | 0 | 0 | 0 | 0 | 0 | 0 |
| Mw | 10531 | 14279 | 9403 | 30000 | 570000 | 39936 | 30000 | 158881 |
| PDi | 1.8 | 2.05 | 2 | 2.7 | 9.1 | 10.2 | 2.7 | 16.62 |
| Q | 9 | 0.7 | 0 | 8.8 | 6.66 | 7.2 | 8.8 | 0 |
| A | 8.7 | 8.7 | 8.7 | 8.7 | 0.45 | 9 | 9 | 0.45 |
| Y | $4.0 \times 10^3$ | $1.83 \times 10^4$ | $2.13 \times 10^4$ | 0.0 | 0.0 | 0 | 0 | 0 |
| Z | 0.0 | $7.06 \times 10^4$ | 0.0 | 0.0 | 0.0 | $9.35 \times 10^4$ | 0 | 0 |
| V | 0.0 | $5.22 \times 10^3$ | $3.75 \times 10^3$ | $4.05 \times 10^3$ | $3.54 \times 10^4$ | 0.0 | $4.05 \times 10^3$ | $7 \times 10^2$ |
| L value | $0 \times 10^4$ | $20 \times 10^4$ | $14 \times 10^4$ | $38 \times 10^4$ | $1 \times 10^8$ | $-1 \times 10^4$ | $37 \times 10^4$ | $5 \times 10^6$ |

| Example | C6 | C6 | C6 | 7 | 7 | 7 | 7 | 7 |
|---|---|---|---|---|---|---|---|---|
| Code | A3 | BT24 | P3 | A4 | A8 | A9 | BT24 | P4 |
| FA (%) | 52 | 0 | 0 | 0 | 39.32 | 0 | 0 | 0 |
| NI (%) | 0 | 0 | 0 | 2 | 36.35 | 20.49 | 0 | 0 |
| Rings | 183.3 | 0 | 0 | 164.2 | 0 | 19.2 | 0 | 438.7 |
| Acid | 39.3 | 131.5 | 27.1 | 38.1 | 13 | 9.1 | 131.5 | 28.2 |
| OH | 16.4 | 0 | 0 | 47.8 | 13 | 57.8 | 0 | 0 |
| Urethane | 366.5 | 0 | 0 | 328.5 | 0 | 39.5 | 0 | 0 |
| Methyl | 0 | 7.757 | 12.725 | 0 | 0 | 0 | 7.757 | 4.592 |
| Styrene | 0 | 0 | 0 | 0 | 0 | 0 | 0 | 45.6 |
| Amide | 91.3 | 0 | 0 | 0 | 0 | 0 | 0 | 0 |
| Mw | 175134 | 30000 | 520000 | 10531 | 21399 | 55413 | 30000 | 570000 |
| PDi | 28.1 | 2.7 | 7.3 | 1.81 | 5.09 | 14.57 | 2.7 | 9.1 |
| Q | 10.7 | 8.8 | 1.81 | 8.98 | 0.93 | 1.63 | 8.77 | 6.66 |
| A | 8 | 0.45 | 0.45 | 6.4 | 6.4 | 6.4 | 0.45 | 0.45 |
| Y | 0.0 | 0.0 | 0.0 | $4 \times 10^3$ | $2.27 \times 10^4$ | $2.88 \times 10^4$ | 0 | 0 |
| Z | $1.04 \times 10^5$ | 0.0 | 0.0 | 0 | $7.86 \times 10^4$ | 0 | 0 | 0 |
| V | 0.0 | $4.05 \times 10^3$ | $2.85 \times 10^4$ | 0.0 | 0.0 | 0.0 | $4.05 \times 10^3$ | $3.54 \times 10^4$ |
| L value | $98 \times 10^4$ | $2 \times 10^6$ | $8 \times 10^7$ | $0 \times 10^4$ | $-8 \times 10^4$ | $9 \times 10^4$ | $2 \times 10^6$ | $1 \times 10^8$ |

| Example | 8 | 8 | 8 | 9 | 9 |
|---|---|---|---|---|---|
| Code | A10 (oligomer) | BT24 | A10 (polymer) | A11 | P4 |
| FA | 68.71 | 0 | 68.71 | 66.52 | 0 |
| NI | 0 | 0 | 0 | 0 | 0 |
| Rings | 0 | 0 | 0 | 0 | 438.7 |
| Acid | 26.4 | 131.5 | 26.4 | 11.6 | 28.2 |
| OH | 26.4 | 0 | 26.4 | 105.6 | 0 |
| Urethane | 0 | 0 | 0 | 0 | 0 |
| Methyl | 0 | 7.757 | 0 | 0 | 4.592 |
| Styrene | 0 | 0 | 0 | 0 | 45.6 |
| Amide | 0 | 0 | 0 | 0 | 0 |
| Mw | 22828 | 30000 | 1377425 | 5942 | 570000 |
| PDi | 5.35 | 2.7 | 2.38 | 1.36 | 9.1 |
| Q | 1.89 | 8.77 | 1.89 | 1.3 | 6.66 |
| A | 4.83 | 0.45 | 0.45 | 0.495 | 0.45 |
| Y | 0 | 0 | 0 | 0 | 0 |
| Z | $1.37 \times 10^5$ | 0 | $1.37 \times 10^5$ | $1.3 \times 10^5$ | 0 |
| V | 0.0 | $4.05 \times 10^3$ | 0.0 | 0 | $3.54 \times 10^4$ |
| L value | $-11 \times 10^4$ | $2 \times 10^6$ | $1 \times 10^7$ | $-11 \times 10^4$ | $1 \times 10^8$ |

Key for Table 7:
FA = fatty acid (%) on component solids
NI = non-ionic (%) on component solids
Rings = Rings (meq/100 g component solids)
Acid = Acid groups (meq/100 g component solids)
OH = OH groups (meq/100 g component solids)
Urethane = Urethane groups (meq/100 g component solids)
Methyl = Methyl residue wt %
Styrene = Styrene residue wt %
Amide = Amide groups (meq/100 g component solids)

TABLE 8

Detailed Calculation Example 1 (pigmented paint A1P1):

| | Amount (g) | Remarks |
|---|---|---|
| Pigment paste C830 | | |
| Byk 344 | 0.341 | (52%: contains 0.13 g xylene; 0.033 g isobutanol) |
| Propylene glycol | 7.50 | |
| Water | 10.32 | |
| AMP-95 | 0.63 | (95%: contains 0.03 g water) |
| Dehydran 1293 | 1.56 | (10%: contains 1.40 g butylglycol) |
| Surfynol 104E | 1.25 | (50%: contains 0.63 g ethyleneglycol) |
| BT24 | 9.69 | (alkaline soluble low Mw acrylic resin from NeoResins 45% solids, Mw = 30.000 g/mole; Pd = 2.7; Acid value = 73.8 mgKOH/g and methyl wt % = 7.757%) This corresponds with 4.36 g non-crosslinkable oligomer |
| Tioxide TR92 | 75.04 | |
| Subtotal paste | 105.99 | (solids = 35.2%) = 43.0 gram polymer P1 |
| NMP | 5.33 | |
| DMPA | 1.28 | |
| Desmodur W | 8.14 | |
| Priplast 3192 | 11.91 | |
| Tinoctoate | 0.0053 | |
| TEA | 0.966 | |
| BMA | 21.33 | |
| Water | 65.61 | |
| Hydrazine | 0.70 | (64.45%: contains 0.25 g water) |
| t-BHPO | 1.11 | (5%: contains 1.05 g water) |
| Iso-ascorbic acid | 5.54 | (1%: contains 5.49 g water) |
| Fe-EDTA | 0.28 | (1%: contains 0.28 g water) |
| Subtotal P1 | 122.2 | |
| Oligomer DA1 | | Mw = 4344 g/mole; Pd = 1.61; The fraction between 200 and 1000 g/mole = 12% |
| DEA | 4.69 | |
| Sunflower oil | 23.63 | |
| NaOMe | 0.048 | |
| Phosphoric acid | 0.034 | |
| DMPA | 2.11 | |
| NMP | 10.09 | |
| MPEG750 | 2.06 | |
| CHDM | 0.98 | |
| TDI | 10.89 | |

TABLE 8-continued

Detailed Calculation Example 1 (pigmented paint A1P1):

| | Amount (g) | Remarks |
|---|---|---|
| DPM | 5.60 | |
| DMEA | 1.12 | |
| Dapro 5005 | 0.64 | (0.24 g n-butanol; 0.25 g xylene; 0.08 g turpentine) |
| Water | 115.88 | |
| Subtotal oligomer dispersion DA1 | 177.77 | (solids = 25.0%) = 44.4 gram oligomer A1 Because 12% is between 200 and 1000 g/mole: = 39.12 g oligomer A1 and 5.33 g reactive diluent |
| Water | 12.18 | |
| TOTAL | 418.14 | Total oligomer: 43.48 g; 5.33 g reactive diluent |

CALCULATION EXAMPLE 1

Initially all species with Mw >1000 g/mole present in this example is regarded as oligomer; First the L-value is calculated starting with the component with the highest Mw being P1: The value for A is first calculated regarding all binder solids with Mw >1000 g/mole as oligomer (see table 9 second column), subsequently the values for Q, Y, Z and V are calculated (see table 10a first column). The L-value for P1 is $10.2 \times 10^6$ and this is greater than $40 \times 10^4$, and therefore P1 is a dispersed polymer. Recalculation of the L=value for P1 with A=0.45, because the assumption is that no solvent, reactive diluent or plasticiser partitions into the dispersed polymer, results in the final L-value for P1 being $4 \times 10^7$. This means that the value for A needs to be recalculated because the weight percentage solvent is based on oligomer solids so only the contribution of BT24 and A1 (see table 9, third column). Then the component with the next highest Mw is calculated, in this case BT24; The L-value for BT24 is $35 \times 10^4$; this is smaller than $40 \times 10^4$ and therefore BT24 is an oligomer. (see table 10b, second column). BT24 is an oligomer and therefore there is no need to recalculate the value for A when calculating the L-value for A1 (see table 9, third column). Subsequently the L-value is calculated of A1 (table 10c; third column). All the weights used in table 9 and 10 are based on the amounts in (g) listed in table 8.

TABLE 9

Calculation of A for polymer P1, crosslinkable oligomer A1 and non-crosslinkable oligomer BT24:

| Components Wt % solvent | | Calculation A for P1 Polymer P1: total binder = 86.48 g | | Calculation A for BT24 and A1 BT24 = 4.36 g A1 = 39.12 g Total oligomers = 43.48 g | |
|---|---|---|---|---|---|
| Solvent type | Evaporation rate | Wt % | Wt % solvent*0.1 (evaporation rate)$^{0.6}$ | Wt % | Wt % solvent*0.1 (evaporation rate)$^{0.6}$ |
| NMP | 0.03 | 17.63 | 14.45 | 35.46 | 29.07 |
| Proglyde DPM | 0.02 (0.03) | 6.40 | 5.25 | 12.88 | 10.56 |
| Propylene glycol | 0.01 (0.03) | 8.58 | 7.03 | 17.25 | 14.14 |
| DMEA | 0.157 | 1.28 | 0.39 | 2.58 | 0.78 |
| TEA | 5.6 | 1.10 | 0.039 | 2.22 | 0.079 |
| Butyl glycol | 0.072 | 1.60 | 0.78 | 3.22 | 1.56 |
| Ethylene glycol | 0.01 (0.03) | 0.72 | 0.59 | 1.45 | 1.19 |
| Xylene | 0.77 | 0.43 | — | 0.87 | — |
| n-butanol | 0.44 | 0.27 | — | 0.55 | — |

TABLE 9-continued

Calculation of A for polymer P1, crosslinkable oligomer A1 and non-crosslinkable oligomer BT24:

| Components Wt % solvent | | Calculation A for P1 Polymer P1: total binder = 86.48 g | | Calculation A for BT24 and A1 BT24 = 4.36 g A1 = 39.12 g Total oligomers = 43.48 g | |
|---|---|---|---|---|---|
| Solvent type | Evaporation rate | Wt % | Wt % solvent*0.1 (evaporation rate)$^{0.6}$ | Wt % | Wt % solvent*0.1 (evaporation rate)$^{0.6}$ |
| Turpentine | 0.41 | 0.09 | — | 0.18 | — |
| iso-butanol | 0.64 | 0.038 | — | 0.076 | — |
| AMP-95 | 0.03 | 0.69 | 0.57 | 1.38 | 1.13 |
| TOTAL SOLVENT | | | 29.10 | | 58.51 |
| Plasticizers: | | | | | |
| SLS | — | 0.08 (<0.5%, ignored) | | 0.17 (<0.5%, ignored) | |
| Dehydran 1293 | — | 0.18 (<0.5%, ignored) | | 0.36 (<0.5%, ignored) | |
| Byk 344 | — | 0.21 (<0.5%, ignored) | | 0.41 (<0.5%, ignored) | |
| Tinoctoate | — | 0.006 (<0.5%, ignored) | | 0.012 (<0.5%, ignored) | |
| Surfynol 104E | | 0.72 | | 1.45 | |
| Reactive diluent A1 | | 6.16 | | 12.3 | |
| TOTAL | | 6.88 A = 5.2 | | 13.75 A = 10 | |

TABLE 10a calculations of the values for Q, Y, Z, V resulting in L for P1
Calculations P1 (43.0 g solids P1)

| 1.28 g DMPA | = 22.2 meq COOH/100 g | Q = 5.01 |
|---|---|---|
| 8.14 g DesW | = 144.5 meq urethane/100 g | |
| | = 144.5 meq rings/100 g | |
| (rings originating from the dimerised fatty acid component are ignored) | | |
| From Table 9 | | A = 5.2 |
| From Table 7 | | Mw = 387200 |
| From Table 7 | | PDi = 6.7 |
| Polyethyleneoxide residue = wt % | | Y = 0 |
| Fatty acid group wt % = 0 | | Z = 0 |
| 21.33 g BMA = 10.56 wt % methyl | | P = 1614652 |
| | | V = 16067 | initial L = 10.2 × 10$^6$ which is > 40 × 10$^4$
Therefore P1 is a polymer, (recalculation with A = 0.45 gives L = 4 × 10$^{7)}$ TABLE 10b calculations of the values for Q, Y, Z, V resulting in L for BT24
Calculations BT24 (4.36 g solids BT24)

| 4.36 g BT24 = 131.5 meq COOH/100 g | Q = 8.77 |
|---|---|
| From Table 9 | A = 10 |
| From Table | Mw = 30000 |
| From Table | PDi = 2.7 |
| Polyethyleneoxide residue = 0 wt % | Y = 0 |
| Fatty acid group wt % = 0 | Z = 0 |
| Methyl wt % BT24 = 7.757 | P = 600513.58 |
| | V = 4053 |

L = 35 × 10$^4$ which is < 40 × 10$^4$
Therefore BT24 is an oligomer

TABLE 10c calculations of the values for Q, Y, Z, V resulting in L for A1
Calculations A1 (44.45 g solids A1)

| 2.11 g DMPA | = 35.4 meq COOH/100 g | Total: |
|---|---|---|
| | = 70.8 meq OH/100 g | 35.4 meq COOH/g |

TABLE 10c-continued calculations of the values for Q, Y, Z, V resulting in L for A1
Calculations A1 (44.45 g solids A1)

| 10.89 g TDI | = 281.6 meq urethane/100 g | 127.5 meq OH/g |
|---|---|---|
| | = 140.8 meq rings/100 g | 281.6 meq urethane/urea/100 g |
| | = −281.6 meq OH/100 g | |
| 0.98 g CHDM | = 30.6 meq OH/100 g | 156.1 meq rings/100 g |
| | = 15.3 meq rings/100 g | 94.5 meq amide/100 g |
| 4.69 g DEA = 94.5 meq amide/100 g | | |
| (conversion is 94% therefore multiplied with 0.94) | | |
| | ≅301.5 meq OH/100 g | |
| 2.06 g = 6.2 meq OH/100 g MPEG750 | | Q = 9.60 |
| From Table 9 | | A = 10 |
| From Table 1b | | Mw = 4344 |
| From Table 1b | | PDi = 1.6 |
| Polyethyleneoxide residue = 4.63 wt % | | Y = 8605 |
| Fatty acid group wt % = 47.6 | | Z = 95200 |
| Methyl wt % = 0 | | V = 0 |

L = −10 × 10$^4$ < 40 × 10$^4$ (and also L >− 15 × 10$^4$)
Therefore A1 is an oligomer

TABLE 11

Evaporation rates of solvents used in the examples and other commonly used solvents

| Type of solvent | Evaporation rate |
|---|---|
| Butyl acetate | 1.00 |
| N-methyl pyrrolidine (NMP) | 0.03 |
| N,N-dimethyl formamide (DMF) | 0.20 |
| N,N-dimethyl acetamide (DMAc) | 0.138 |
| Xylene | 0.77 |
| Methyl ethyl ketone (MEK) | 4.03 |
| Turpentine | 0.41 |
| n-Butanol | 0.44 |
| i-Butanol | 0.64 |
| Ethylene glycol (EG) | 0.03 |
| Ethylene glycol ethyl ether (EGE) | 0.39 |
| Ethylene glycol butyl ether (BG) | 0.072 |
| Ethylene glycol methyl ether acetate (EGMA) | 0.353 |

TABLE 11-continued

Evaporation rates of solvents used in the examples and other commonly used solvents

| Type of solvent | Evaporation rate |
|---|---|
| Ethylene glycol ethyl ether acetate (EEA) | 0.19 |
| Diethylene glycol (DEG) | <0.01 |
| Diethylene glycol methyl ether (MDG) | 0.018 |
| Diethylene glycol n-propyl ether (PDG) | 0.01 |
| Diethylene glycol n-butyl ether (BDG) | 0.003 |
| Diethylene glycol ethyl ether acetate (DGEA) | 0.008 |
| Propylene glycol (PG) | 0.03 |
| Propylene glycol methyl ether (PM) | 0.62 |
| Propylene glycol n-propyl ether (PnP) | 0.21 |
| Propylene glycol n-butyl ether (PnB) | 0.093 |
| Propylene glycol methyl ether acetate (PMA) | 0.33 |
| Dipropylene glycol (DPG) | <0.01 |
| Dipropylene glycol methyl ether (DPM) | 0.03 |
| Dipropylene glycol n-propyl ether (DPnP) | 0.014 |
| Dipropylene glycol n-butyl ether (DPnB) | 0.006 |
| Dipropylene glycol methyl ether acetate (DPMA) | <0.01 |
| Texanol | 0.002 |
| 2-(Hydroxymethyl)-2-amino-ethanol | 0.03 |
| 2-Amino-2-methyl-propanol | 0.03 |
| Triethyl amine | 5.6 |
| N,N-dimethyl ethanolamine (DMEA) | 0.157 |

The invention claimed is:

1. An aqueous coating composition comprising an ambient temperature crosslinkable water-dispersible oligomer(s) with a measured weight average molecular weight in the range of from 1,000 to 100,000 Daltons, selected from the group consisting of vinyl oligomer(s), polyamide oligomer(s), polycarbonate oligomer(s), polyester oligomer(s), polyether oligomer(s) and polysiloxane oligomer(s), a dispersed polymer(s) with a measured weight average molecular weight $\geq 110,000$ Daltons and a particle size in the range of from 120 to 600 nm, selected from the group consisting of vinyl polymer, polyester, polyamide, polyepoxide, urethane-acrylic polymers, epoxy-acrylic polymers and polyester-acrylic polymers and optionally a non-crosslinkable water-dispersible oligomer selected from the group consisting of vinyl oligomer(s), polyamide oligomer(s), polycarbonate oligomer(s), polyester oligomer(s), polyether oligomer(s), polysiloxane oligomer(s) and polyurethane oligomer(s), wherein the ratio of crosslinkable oligomer(s) to dispersed polymer(s) is in the range of from 90:10 to 10:90; wherein the water-dispersible crosslinkable and water-dispersible non-crosslinkable oligomer has a solubility of less than 80% by weight in water throughout a pH range of from 2 to 10; and
wherein the crosslinkable oligomer(s) and non-crosslinkable oligomer(s) comply with Equation 1 as follows:

$$-15 \times 10^4 < L = \frac{Mw \times PDi^{0.8}}{A} \times (1+Q)^{0.5} + \{(Mw \times PDi^{0.8})/A\}^{0.5} \times V - Y - Z < 40 \times 10^4$$

wherein:
L for the oligomer being calculated is a dimensionless number; all values are used as values without their dimensions, except for the values used in the sine functions which are defined below;
Mw=weight average molecular weight;
PDi=polydispersity index;
Q=(meq COOH/100 g)/15+(meq OH/100 g)/200+[(meq {urethane*+urea*}/100 g)/75]+[(meq {urethane+urea}/100 g)/220]+(meq rings/100 g)/90+(meq amide/100 g)/85+(meq nitrile/100 g)/100, where meq COOH/100 g represents the milliequivalents of carboxylic acid groups present per 100 g of solid oligomer(s) that is being calculated and mutatis mutandis for OH groups, rings (i.e. aromatic, cycloaliphatic or heterocyclic rings) urethane, urea, amide and nitrile, it being understood that not all such groups need to be present, in which case the meq. would be zero and where *=not derived from tetramethyl-1,3-xylenediisocyanate and where **=derived from tetramethyl-1,3-xylenediisocyanate;

A=

$$\left\{ \left( \left[ 9 + 3.16 \times \sum_{i=1}^{n} \{\text{wt.\% solvent } i \times 0.1/[\text{evaporation rate solvent } i]^{0.6}\} \right] /20 \right) + 0.025 \times (\text{plasticiser wt.\%} + \text{reactive diluent wt.\%}) \right\},$$

where the wt. % of solvent, plasticiser and reactive diluent present in the total composition in each case are based on the weight of crosslinkable and non-crosslinkable oligomer(s) in the composition;
n=total number of solvents, and
if no solvent is present A=0.45, and
where for all solvents with an evaporation rate less then 0.03 the value for the evaporation rate is to be taken as 0.03,
Y=30000×sine {(polyoxyethylene residue wt. %)×3.6} where {(polyoxyethylene residue wt. %)×3.6} is expressed in the unit degrees, and where the wt. % of polyethyleneoxide residue is based on the weight of the oligomer [that is being calculated];
Z=fatty acid group residue wt. %×2,000 where the wt. % of fatty acid group residue is based on the weight of the oligomer [that is being calculated];
V=(P+{P/(P+0.1)}×75,000)×{Mw/[100×(Mw+20, 000)]}, and
P=({sine[((methyl residue wt. %+(0.2×(styrene residue wt. %+alphamethylstyrene residue wt. %)))×6)−45]+1}⁴×200,000×R),
where [((methyl residue wt. %+(0.2×(styrene residue wt. %+alphamethylstyrene residue wt. %))×6)−45] is expressed in the unit degrees and the wt. % of methyl, styrene and alphamethylstyrene residues are based on the weight of vinyl oligomer [that is being calculated] excluding fatty acid groups, and R=2.7 and if less then 4 wt % vinyl oligomer is present based on the weight of binder material then R=zero and wherein said composition has:
  i) an open time of at least 20 minutes at 23±2° C.;
  ii) a wet-edge time of at least 10 minutes at 23±2° C.;
  iii) a tack-free time of less than 20 hours at 23±2° C.;
  iv) 0 to 25 wt. % of co-solvent by weight of the composition.

2. An aqueous coating composition comprising an ambient temperature crosslinkable water-dispersible oligomer(s) with a measured weight average molecular weight in the range of from 1,000 to 100,000 Daltons, selected from the group consisting of vinyl oligomer(s), polyamide oligomer(s), polycarbonate oligomer(s), polyester oligomer(s), polyether oligomer(s) and polysiloxane oligomer(s), a dispersed polymer(s) with a measured weight average molecular weight ≧110,000 Daltons and a particle size in the range of from 120 to 600 nm, selected from the group consisting of vinyl polymer, polyester, polyamide, polyepoxide, urethane-acrylic polymers, epoxy-acrylic polymers and polyester-acrylic polymers and optionally a non-crosslinkable water-dispersible oligomer(s) selected from the group consisting of vinyl oligomer(s), polyamide oligomer(s), polycarbonate oligomer(s), polyester oligomer(s), polyether oligomer(s), polysiloxane oligomer(s) and polyurethane oligomer(s) wherein the ratio of crosslinkable oligomer(s) to dispersed polymer(s) is in the range of from 90:10 to 10:90;

wherein the water-dispersible crosslinkable and water-dispersible non-crosslinkable oligomer has a solubility of less than 80% by weight in water throughout a pH range of from 2 to 10; and wherein said composition has a drying profile as determined using a Thin Film Analyser (TFA) at 23±1° C., where the TFA shows an average force, from each series of successive scratches (≧5 scratches), measured during a 5 minute interval of less than 12000 mg for at least the first 20 minutes and an average force from at least one series of successive scratches (≧5 scratches) measured during a 5 minute interval, of at least 12000 mg between 20 and 60 minutes after application of the composition and wherein said composition has:

i) an open time of at least 20 minutes at 23±2° C.;
ii) a wet-edge time of at least 10 minutes at 23±2° C.;
iii) a tack-free time of less than 20 hours at 23±2° C.;
iv) 0 to 25 wt. % of co-solvent by weight of the composition.

3. An aqueous coating composition comprising an ambient temperature crosslinkable water-dispersible oligomer(s) with a measured weight average molecular weight in the range of from 1,000 to 100,000 Daltons, selected from the group consisting of vinyl oligomer(s), polyamide oligomer(s), polycarbonate oligomer(s), polyester oligomer(s), polyether oligomer(s) and polysiloxane oligomer(s) a dispersed polymer(s) with a measured weight average molecular weight ≧110,000 Daltons and a particle size in the range of from 120 to 600 nm, selected from the group consisting of vinyl polymer, polyester, polyamide, polyepoxide, urethane-acrylic polymers, epoxy-acrylic polymers and polyester-acrylic polymers and optionally a water-dispersible non-crosslinkable oligomer(s) selected from the group consisting of vinyl oligomer(s), polyamide oligomer(s), polycarbonate oligomer(s), polyester oligomer(s), polyether oligomer(s), polysiloxane oligomer(s) and polyurethane oligomer(s) wherein the ratio of crosslinkable oligomer(s) to dispersed polymer(s) is in the range of from 90:10 to 10:90;

wherein the water-dispersible crosslinkable and water-dispersible non-crosslinkable oligomer has a solubility of less than 80% by weight in water throughout a pH range of from 2 to 10; and wherein said composition has a drying profile as determined using a Thin Film Analyser (TFA) at 23±1° C., wherein:

(a) the force for each series of successive scratches (≧8 scratches) measured during an eight minute interval in the first 20 minutes, more preferably 23 minutes, most preferably 26 minutes after application of the coating is less then 1.5, more preferably less than 1.35 and most preferably less then 1.25 times the average force for a series of successive scratches (≧8 scratches) measured during an eight minute interval between 7 and 15 minutes after application of the coating; and (b) the average force for at least one series of successive scratches (≧8 scratches) measured during an eight minute interval measured between 21 and 60 minutes after application is at least 2000 mg more than each series of successive scratches (≧8 scratches) measured during an eight minute interval in the first 20 minutes, more preferably 23 minutes after application of the coating; and wherein said composition has:

i) an open time of at least 20 minutes at 23±2° C.;
ii) a wet-edge time of at least 10 minutes at 23±2° C.;
iii) a tack-free time of less than 20 hours at 23±2° C.;
iv) 0 to 25 wt. % of co-solvent by weight of the composition.

4. An aqueous coating composition according to claim 1 where said crosslinkable water-dispersible oligomer(s) is a polyester oligomer(s);
where said dispersed polymer is a urethane-acrylic polymer; and where said optional non-crosslinkable water-dispersible oligomer(s) is a polyurethane oligomer(s).

5. An aqueous coating composition according to claim 2 where said crosslinkable water-dispersible oligomer(s) is a polyester oligomer(s);
where said dispersed polymer is a urethane-acrylic polymer; and where said optional non-crosslinkable water-dispersible oligomer(s) is a polyurethane oligomer(s).

6. An aqueous coating composition according to claim 3 where said crosslinkable water-dispersible oligomer(s) is a polyester oligomer(s);
where said dispersed polymer is a urethane-acrylic polymer; and where said optional non-crosslinkable water-dispersible oligomer(s) is a polyurethane oligomer(s).

7. An aqueous coating composition according to claim 1 wherein said composition has a drying profile as determined using a Thin Film Analyser (TFA) at 23±1° C., where the Thin Film Analyser shows an average force, for each series of successive scratches (≧5 scratches), measured during a 5 minute interval of less than 12000 mg for at least the first 20 minutes and an average force from at least one series of successive scratches (≧5 scratches) measured during a 5 minute interval, of at least 12000 mg between 20 and 60 minutes after application of the composition.

8. An aqueous coating composition according to claim 1 wherein said composition has a drying profile as determined using a Thin Film Analyser (TEA) at 23±1° C., wherein:

(a) the average force for each series of successive scratches (≧8 scratches) measured during an eight minute interval in the first 20 minutes, more preferably 23 minutes, most preferably 26 minutes after application of the coating is less then 1.5, more preferably less than 1.35 and most preferably less then 1.25 times the average force for a series of successive scratches (≧8 scratches) measured during an eight minute interval between 7 and 15 minutes after application of the coating; and (b) the average force for at least one series of successive scratches (≧8 scratches) measured during an eight minute interval measured between 21 and 60 minutes after application is at least 2000 mg more, more preferably at least 2500 mg more, and most preferably at least 3000 mg more than each series of successive scratches (≧8 scratches) measured during an eight minute interval in the first 20 minutes, more preferably 23 minutes, most preferably 26 minutes after application of the coating.

9. An aqueous composition according to claim 1 wherein the crosslinkable oligomer(s) has a measured Tg in the range of from −120 to 100° C.

10. An aqueous composition according to claim 1 wherein the crosslinkable water-dispersible oligomer(s) is self-crosslinkable.

11. An aqueous composition according to claim 1 wherein the crosslinkable water-dispersible oligomer(s) is crosslinkable by autoxidation.

12. An aqueous composition according to claim 11 wherein the crosslinkable water-dispersible oligomer(s) contains autoxidisable groups and carbonyl functional groups.

13. An aqueous composition according to claim 1 wherein the crosslinkable water-dispersible oligomer(s) is crosslinkable by Schiff base crosslinking.

14. An aqueous composition according to claim 1 wherein the crosslinkable water-dispersible oligomer(s) is crosslinkable by silane condensation.

15. An aqueous composition according to claim 1 wherein the dispersed polymer is a dispersed vinyl polymer.

16. An aqueous composition according to claim 15 wherein the dispersed polymer(s) has a measured Tg in the range of from −50 to 300° C.

17. An aqueous composition according to claim 1 wherein the dispersed polymer(s) has an acid value below 100 mgKOH/g.

18. An aqueous coating composition according to claim 1 comprising:
    i) 0 to 15% co-solvent by weight of binder material;
    ii) 30 to 60% of crosslinkable oligomer(s) by weight of binder material; wherein the crosslinkable oligomer(s) comprises 45 to 7 wt % of fatty acid groups; and wherein the dispersed polymer(s) has an acid value below 20 mgKOH/g.

19. An aqueous coating composition according to claim 1 comprising:
    i) 3 to 26% of a crosslinkable oligomer(s) by weight of the composition;
    ii) 0 to 6.5% of a non-crosslinkable oligomer(s) by weight of the composition;
    iii) 10 to 56% of dispersed polymer(s) by weight of the composition;
    iv) 0 to 15% of co-solvent by weight of the composition;
    v) 5 to 65% of water by weight of the composition;
    where i)+ii)+iii)+iv)+v)=100%.

20. An aqueous coating composition according to claim 1 comprising:
    i) 4 to 40% of a crosslinkable oligomer(s) by weight of binder material;
    ii) 0 to 10% of a non-crosslinkable oligomer(s) by weight of binder material;
    iii) 50 to 85% of dispersed polymer(s) by weight of binder material; where i)+ii)+iii)=100%.

21. An aqueous coating composition according to claim 1 additionally comprising a pigment.

22. A coating obtained from an aqueous composition according to claim 1.

23. An aqueous coating composition according to claim 11 wherein the crosslinkable water-dispersible oligomer(s) is crosslinkable by autoxidation in combination with Schiff base crosslinking.

24. An aqueous coating composition according to claim 13 wherein the crosslinkable water-dispersible oligomer(s) is crosslinkable by Schiff base crosslinking in combination with silane condensation.

25. An aqueous coating composition according to claim 14 wherein the crosslinkable water-dispersible oligomer(s) is crosslinkable by silane condensation in combination with autoxidation.

\* \* \* \* \*